US012362458B2

(12) United States Patent
Yun et al.

(10) Patent No.: US 12,362,458 B2
(45) Date of Patent: Jul. 15, 2025

(54) ELECTRONIC DEVICE INCLUDING SLOT ANTENNA

(71) Applicant: Samsung Electronics Co., Ltd., Gyeonggi-do (KR)

(72) Inventors: Sumin Yun, Gyeonggi-do (KR); Kyunggu Kim, Gyeonggi-do (KR); Kyungmoon Seol, Gyeonggi-do (KR); Kyihyun Jang, Gyeonggi-do (KR); Jaebong Chun, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 214 days.

(21) Appl. No.: 18/083,813

(22) Filed: Dec. 19, 2022

(65) Prior Publication Data

US 2023/0118903 A1 Apr. 20, 2023

Related U.S. Application Data

(63) Continuation of application No. PCT/KR2021/016563, filed on Nov. 12, 2021.

(30) Foreign Application Priority Data

Nov. 13, 2020 (KR) ........................ 10-2020-0152073
Dec. 14, 2020 (KR) ........................ 10-2020-0174767

(51) Int. Cl.
*H01Q 1/24* (2006.01)
*H01Q 13/10* (2006.01)

(52) U.S. Cl.
CPC ........... *H01Q 1/243* (2013.01); *H01Q 13/106* (2013.01)

(58) Field of Classification Search
USPC .......................................................... 343/702
See application file for complete search history.

(56) References Cited

U.S. PATENT DOCUMENTS 8,654,030 B1 2/2014 Mercer
10,075,569 B2 9/2018 Kim et al.
(Continued)

FOREIGN PATENT DOCUMENTS

KR 10-2014-0105886 9/2014
KR 10-2017-0050270 5/2017
(Continued)

OTHER PUBLICATIONS

European Search Report dated Feb. 13, 2024 issued in counterpart application No. 21892372.0-1205, 8 pages.
(Continued)

*Primary Examiner* — Hoang V Nguyen
*Assistant Examiner* — Brandon Sean Woods
(74) *Attorney, Agent, or Firm* — The Farrell Law Firm, P.C.

(57) ABSTRACT

An electronic device is provided that includes a first housing including a first conductive region with a first slot structure that extends to a first edge of the first housing. The electronic device also includes a second housing movable with respect to the first housing and including a second conductive region with a second slot structure that extends to a second edge of the second housing. The electronic device also includes a wireless communication circuit that feeds power to a point on the first slot structure. The wireless communication circuit receives a first signal on a first electrical path including the first slot structure while the first edge and the second edge are spaced apart from each other, and receives a second signal on a second electrical path including the first slot structure and the second slot structure while the first edge is in contact with the second edge.

20 Claims, 26 Drawing Sheets

(56) References Cited

U.S. PATENT DOCUMENTS

| | | | | |
|---|---|---|---|---|
| 10,079,425 | B2 | 9/2018 | Chun et al. | |
| 10,424,272 | B2 | 9/2019 | Yoon et al. | |
| 10,446,911 | B2 * | 10/2019 | Karilainen | H01Q 3/24 |
| 10,615,485 | B2 | 4/2020 | Chun et al. | |
| 10,629,982 | B2 | 4/2020 | Kim et al. | |
| 10,879,589 | B2 | 12/2020 | Lim et al. | |
| 11,470,729 | B2 | 10/2022 | Kim et al. | |
| 2012/0194394 | A1 | 8/2012 | Togash et al. | |
| 2013/0009829 | A1 | 1/2013 | Kurihara | |
| 2018/0048359 | A1 | 2/2018 | Kim et al. | |
| 2018/0287246 | A1 * | 10/2018 | Kim | H01Q 9/42 |
| 2018/0366813 | A1 | 12/2018 | Kim et al. | |
| 2019/0103656 | A1 | 4/2019 | Shi et al. | |
| 2020/0068054 | A1 | 2/2020 | Kim et al. | |
| 2020/0266524 | A1 | 8/2020 | Yoon et al. | |
| 2020/0333855 | A1 | 10/2020 | Kim et al. | |
| 2021/0359411 | A1 * | 11/2021 | Hwang | H01Q 21/28 |

FOREIGN PATENT DOCUMENTS

| | | |
|---|---|---|
| KR | 10-2017-0056246 | 5/2017 |
| KR | 10-2017-0062327 | 6/2017 |
| KR | 10-2017-0120985 | 11/2017 |
| KR | 10-2019-0115888 | 10/2019 |
| KR | 10-2019-0143029 | 12/2019 |
| KR | 10-2021-0130537 | 11/2021 |
| WO | WO 2020/054883 | 3/2020 |

OTHER PUBLICATIONS

PCT/ISA/210 Search Report issued on PCT/KR2021/016563, Mar. 10, 2022, pp. 5.

PCT/ISA/237 Written Opinion issued on PCT/KR2021/016563, Mar. 10, 2022, pp. 3.

* cited by examiner

< First State >

< Second State >

ELECTRONIC DEVICE INCLUDING SLOT ANTENNA

CROSS-REFERENCE TO RELATED APPLICATIONS

This application is a continuation of International Application No. PCT/KR2021/016563 designating the United States, filed in the Korean IP Receiving Office on Nov. 12, 2021, and based on and claims priority under 35 U.S.C. § 119(a) to Korean Application Nos. 10-2020-0152073 and 10-2020-0174767, filed in the Korean IP Office on Nov. 13, 2020 and Dec. 14, 2020, respectively, the content of which is incorporated herein by reference

FIELD

The disclosure relates generally to an electronic device, and more particularly to an electronic device including a slot antenna.

BACKGROUND

With the development of display technology, various types of display devices are being developed. A flexible display device is an example of a next-generation display device. A portable electronic device may include a display having a larger area in order to provide a wide screen. However, since the size of the electronic device also increases as the size of the display increases, the size of the display may be limited. In order to overcome this limitation, in a next-generation display device having a rollable display, a portion of the display may be selectively disposed within a housing.

An electronic device having a communication function may include a plurality of antennas in order to provide mobile communication services through different frequency bands while also having a reduced size and weight. For example, a multi-input multi-output (MIMO) technique is defined in IEEE 802.11n, IEEE 802.11ac, and IEEE 802.11ax standards, and MIMO antennas related to 2G, 3G, 4G, and 5G may be included in an electronic device.

An electronic device that is capable of changing a size of a visually exposed display may have a state in which a second housing is slid away from a first housing (e.g., a first state) and a state in which the first housing and the second housing are disposed adjacent to each other (e.g., a second state). In the first state, a slot antenna disposed in a conductive region of the first housing may transmit or receive a radio frequency (RF) signal of a first frequency band. In the second state, the second housing may be adjacent to the first housing and may affect the slot antenna. Accordingly, radiation efficiency of the slot antenna in the first frequency band may be deteriorated while the electronic device is in the second state.

SUMMARY

According to the present disclosure, an electronic device is provided that is capable of securing performance of an antenna using a slot structure in both the first state and the second state.

According to an aspect of the disclosure, an electronic device is provided that includes a first housing including a first conductive region. The first conductive region includes a first slot structure that extends to a first edge of the first housing. The electronic device also includes a second housing configured to be movable with respect to the first housing and including a second conductive region. The second conductive region includes a second slot structure that extends to a second edge of the second housing. The electronic device also includes a wireless communication circuit configured to feed power to a first point on the first slot structure. The wireless communication circuit is configured to receive a first signal of a first frequency band based on a first electrical path that includes the first slot structure while the electronic device is in a first state in which the first edge of the first housing and the second edge of the second housing are spaced apart from each other, and to receive a second signal of the first frequency band based on a second electrical path that includes the first slot structure and the second slot structure while the electronic device is in a second state in which the first edge of the first housing is in contact with the second edge of the second housing.

According to an aspect of the disclosure, an electronic device is provided that includes a first housing including a first conductive region. The first conductive region includes a first slot structure that extends to a first edge of the first housing. The electronic device also includes a second housing that is movable with respect to the first housing and includes a second conductive region. The second conductive region includes a second slot structure that extends to a second edge of the second housing. The electronic device also includes a wireless communication circuit configured to feed power to a first point on the first slot structure. The wireless communication circuit is configured to receive a first signal of a first frequency band based on a first electrical path that includes the first slot structure while the electronic device is in a first state in which the first edge of the first housing and the second edge of the second housing are spaced apart from each other, and to receive a second signal of the first frequency band based on a second electrical path that includes the first slot structure and the second slot structure while the electronic device is in a second state in which the first edge of the first housing and the second edge of the second housing are in contact with each other. In the second state, a first end of the first slot structure and a second end of the second slot structure are in contact with each other or are adjacent to each other within a predetermined distance.

When the electronic device is switched from the first state to the second state, it is possible to prevent the antenna with the first slot structure in the first housing from having a deteriorated antenna radiation performance in the first frequency band due to the influence of the adjacent second housing.

In addition, when the wireless communication circuit can transmit and/or receive a signal of a first frequency band using the antenna with the first slot structure in the first state, the wireless communication circuit can transmit or receive a signal of the first frequency band as in the first state, while in the second state, based on the electrical path including the first slot structure and the second slot structure.

Furthermore, in the second state, the wireless communication circuit can transmit and/or receive an RF signal of the second frequency band, which is higher than the first frequency band, based on an electrical path including a third slot structure that extends from a point of the second slot structure.

In addition, various effects directly or indirectly understood through this document can be provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to the accompanying drawings. However, it shall be understood that it is not intended to limit the disclosure to specific embodiments, and that the disclosure includes various modifications, equivalents, or alternatives of the embodiments of the disclosure.

Figure 1:
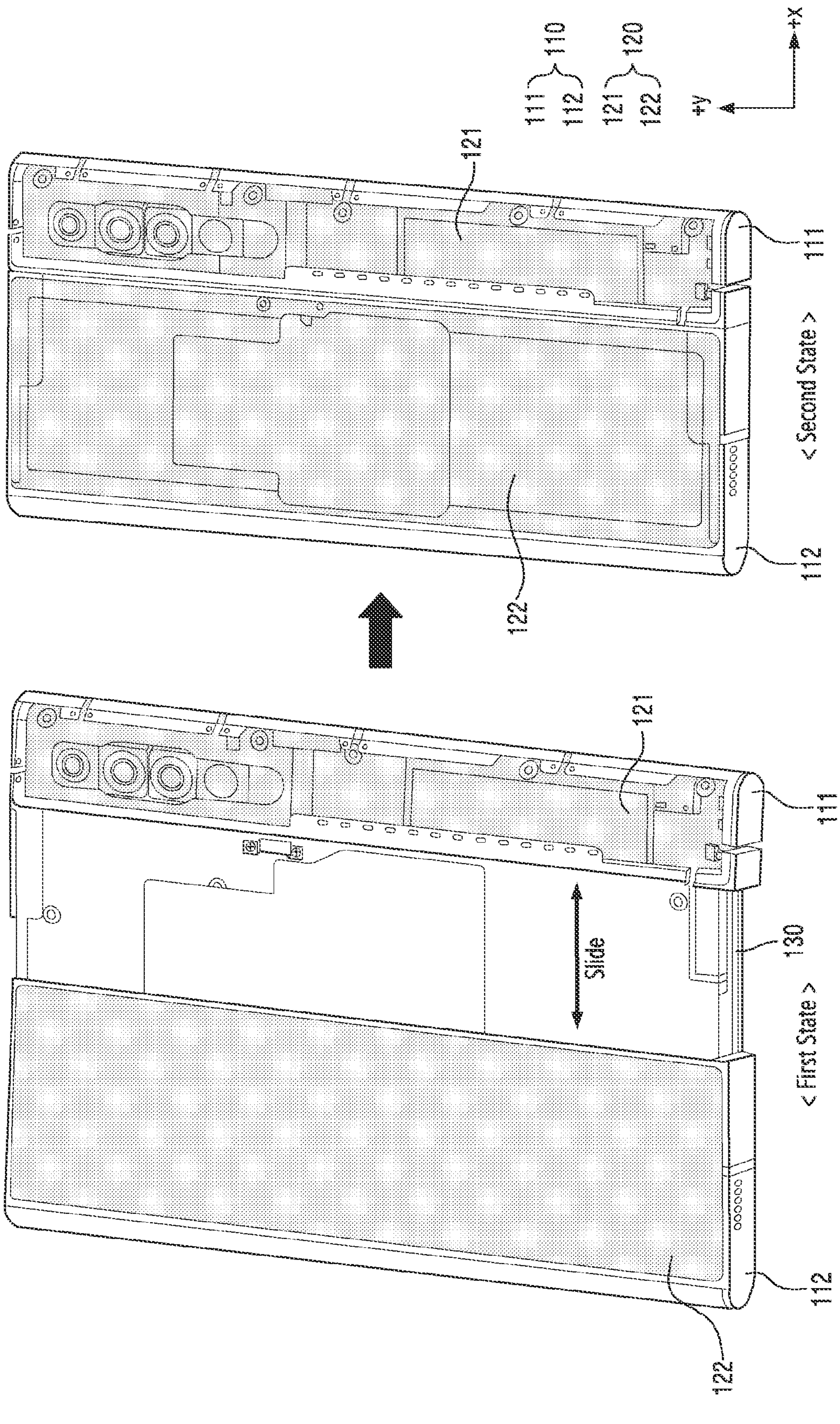
FIG. 1 is a diagram illustrating rear perspective views of an electronic device in the first state and the second state, according to an embodiment.

FIG. 1 is a diagram illustrating rear perspective views of an electronic device in the first state and the second state, according to an embodiment.

Referring to FIG. 1, according to an embodiment, an electronic device 100 may include a housing 110 forming an external structure.

According to an embodiment, the housing 110 may form a partial region of the front surface, a partial region of the rear surface, and/or a side surface of the electronic device 100. Alternatively, the housing 110 may form a partial region of the side surface and/or the rear surface of the electronic device 100. In an embodiment, the housing 110 may include a conductive material (e.g., metal).

According to an embodiment, the housing 110 may include a first housing 110 and a second housing 112 coupled to the first housing 111 and capable of moving (e.g., sliding in or sliding out) in a predetermined range relative to the first housing 111.

According to an embodiment, the electronic device 100 may have a first state and a second state. Alternatively, the electronic device 100 may have a first state, a second state, and an intermediate state between the first state and the second state.

In an embodiment, the first state and the second state of the electronic device 100 may be determined depending on a relative position of the second housing 112 with respect to the first housing 111.

For example, the state in which the second housing 112 slides in a direction away from the first housing 111 (e.g., the −x direction) may be referred to as the first state. The state in which the second housing 112 slides in a direction closer to the first housing 111 (e.g., the +x direction), from the first state, so that the first housing 111 and the second housing 112 are adjacent to or in contact with each other, may be referred to as the second state.

In an embodiment, the electronic device 100 may be switched between the first state and the second state by user manipulation or mechanical operation. The housing 110 may include a button, and the electronic device 100 may be switched between the first state and the second state through user input of pressing or touching the button.

According to an embodiment, a rear cover 120 may be located on one surface of the electronic device 100. Hereinafter, the surface on which the rear cover 120 is located is referred to as a rear surface.

According to an embodiment, the rear cover 120 may occupy most of the rear surface of the electronic device 100.

In an embodiment, the rear cover 120 may be made of coated or colored glass, ceramic, polymer, or a combination of at least two of the above materials.

According to an embodiment, the rear cover 120 may include a first rear cover 121 and a second rear cover 122. In an embodiment, the first rear cover 121 may be disposed on the rear surface of the first housing 111, and the second rear cover 122 may be disposed on the rear surface of the second housing 112. As shown in FIG. 1, internal components are illustrated in a form visible through the first rear cover 121 and the second rear cover 122, but this is for convenience of description, and the first rear cover 121 and the second rear cover 122 may be made of an opaque material. For example, the rear surface of the electronic device 100 may be implemented in a form having a predetermined color or texture of the rear cover 120.

According to another embodiment, the rear cover 120 may be integrated with the housing 110. Alternatively, the electronic device 100 may not include the rear cover 120, and the rear cover 120 may be replaced with the rear surface of the housing 110.

According to an embodiment, when the electronic device 100 is in the second state, the first rear cover 121 and the second rear cover 122 may be in contact with or adjacent to each other, and may appear to be integrated with each other.

According to an embodiment, the electronic device 100 may include a sliding structure 130 (e.g., a hinge rail or an articulated hinge module) that is accommodated in an inner space of the second housing 112 in the second state.

As described in greater detail below with reference to FIG. 2A, at least a portion of a flexible display is accommodated in the inner space of the second housing 112 while being supported by the sliding structure 130 during switching from the first state to the second state, and thereby not being visually exposed from the outside. At least a portion of the flexible display is visually exposed from the outside while being supported by the sliding structure 130 in the first state.

The shape of the electronic device illustrated in FIG. 1 is provided as an example of an electronic device capable of extending a display area, and the shape of the electronic device is not limited to that which is illustrated in FIG. 1.

Figure 2A:
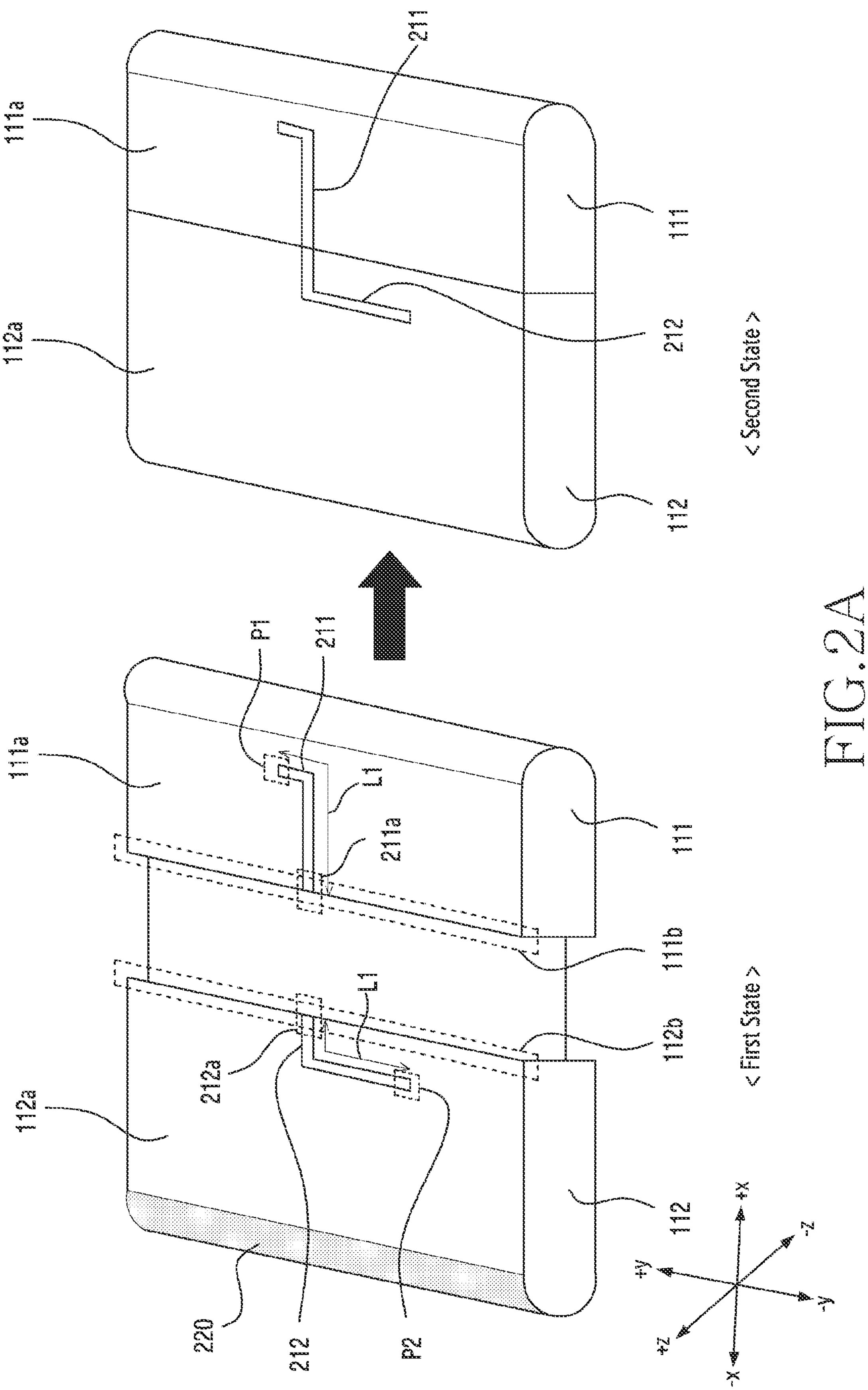
FIG. 2A is a diagram illustrating a first slot structure and a second slot structure when the electronic device is in the first state and the second state, according to an embodiment.

FIG. 2A is a diagram illustrating a first slot structure and a second slot structure when the electronic device is in the first state and the second state, according to an embodiment.

Referring to FIG. 2A, the electronic device 100 according to an embodiment may include a first housing 111, the second housing 112, and/or a flexible display 220. The same reference numerals are used for the same or substantially the same components as those described above, and redundant descriptions are omitted.

According to an embodiment, the first housing 111 may include a first conductive region 111*a*. In an embodiment, the first conductive region 111*a* may include a first slot structure 211.

According to an embodiment, the first slot structure 211 may extend from a first point P1 of the first conductive region 111*a* to a first edge 111*b* of the first housing 111. In an embodiment, a first end 211*a* of the first slot structure 211 may be open, and the first slot structure 211 may have an open slot structure.

In an embodiment, the length from the first point P1 to the first end 211*a* of the first slot structure 211 may be referred to as a first length L1.

According to an embodiment, the first slot structure 211 may have an L shape. The first slot structure 211 may have various shapes (e.g., a straight line shape, a diagonal shape, or a V shape) other than the L shape.

According to an embodiment, the first length L1 and the shape of the first slot structure 211 may vary depending on the operating frequency of the slot antenna including the first slot structure 211, and thus, the first slot structure 211 is not limited to a specific length or shape.

According to an embodiment, the second housing 112 may include a second conductive region 112*a*. In an embodiment, the second conductive region 112*a* may include a second slot structure 212.

According to an embodiment, the second slot structure 212 may extend from a second point P2 of the second conductive region 112*a* to a second edge 112*b* of the second housing 112. In an embodiment, a second end 212*a* of the second slot structure 212 may be open, and the second slot structure 212 may have an open slot structure.

In an embodiment, the length from the second point P2 to the second end 212*a* of the second slot structure 212 may be substantially the same as the first length L1 of the first slot structure 211.

In another embodiment, the physical length from the second point P2 to the second end 212*a* may not be the same as the first length L1. However, even if the physical length of the second slot structure 212 is different from the physical length of the first slot structure 211, substantially the same electrical length may be secured by using a lumped element and/or an impedance matching circuit. For example, even if the physical length of the second slot structure 212 is different from the physical length of the first slot structure 211, it is possible to make the second slot structure 212 have the same length as that of the first slot structure 211 in terms of RF by electrically connecting a lumped element or an impedance matching circuit to the second slot structure 212. For example, a second slot antenna including the first slot structure 211 and the second slot structure 212 may transmit and/or receive an RF signal of substantially the same frequency band as the first slot antenna including the first slot structure 211. However, for convenience of description, the second slot structure 212 will be described as having substantially the same physical length (e.g., the first length L1) as the first slot structure 211.

In an embodiment, the second slot structure 212 may have an inverted-L shape. the second slot structure 212 may have various shapes (e.g., a straight line shape, a diagonal shape, or a V shape) other than the inverted-L shape. The second slot structure 212 may have an L shape symmetrical to the first slot structure 211.

According to another embodiment, the first slot structure 211 may be provided to penetrate the first conductive region 111*a* of the first housing 111, and the first slot structure 211 may have a dielectric material (e.g., a plastic resin) therein. The second slot structure 212 may be provided to penetrate the second conductive region 112*a* of the second housing 112, and the second slot structure 212 may have a dielectric material therein.

According to an embodiment, the first slot structure 211 and the second slot structure 212 may be spaced apart from each other or may be in contact with each other depending on the state of the electronic device 100. For example, in the first state, since the first housing 111 and the second housing 112 are spaced apart from each other, the first slot structure 211 and the second slot structure 212 may be spaced apart from each other by a predetermined distance.

In the second state, the first end 211*a* of the first slot structure 211 may be in direct contact with the second end 212*b* of the second slot structure 212. For example, in the second state, the first conductive region 111*a* and the second conductive region 112*a* may be electrically connected to each other. The first slot structure 211 and the second slot structure 212 may operate as a single closed slot structure.

According to an embodiment, in the second state, the first end 211*a* of the first slot structure 211 and the second end 212*b* of the second slot structure 212 are in contact with each other via a contact structure (e.g., a C-clip and/or a pogo pin). In this case, the conductive boundary portions of the first slot structure 211 and the second slot structure 212 may be in contact with each other via the contact structure to be electrically connected to each other. In an embodiment, a space defined by the first slot structure 211, the second slot structure 212, and the contact structure may be filled with a dielectric material (e.g., injection or air gap).

According to another embodiment, in the second state, the first end 211*a* of the first slot structure 211 and the second end 212*b* of the second slot structure 212 may be disposed adjacent to each other within a predetermined range. In an embodiment, in the second state, the first slot structure 211 and the second slot structure 212 may be electromagnetically connected through a coupling method. In an embodiment, the coupling method may refer to a phenomenon in which alternating current (AC) signal energy is electromagnetically transmitted between independent spaces or lines.

According to another embodiment, the electronic device 100 may include a lumped element (e.g., a capacitor or an inductor) for impedance matching. In an embodiment, the electronic device 100 may include a switch circuit, and the switch circuit may control the first slot structure 211 and/or the second slot structure 212 to be electrically connected to or cut off from the lumped element depending on a change in state of the electronic device 100. For example, in the first state, the switch circuit may include a plurality of switch ports. Among the plurality of switch ports, a first switch port may be electrically connected to a capacitor, a second switch port may be electrically connected to an inductor, and a third switch port may be electrically connected to the second slot structure 212. The switch circuit may short the first switch port and the third switch port. In this case, the second slot structure 212 may be electrically connected to a capacitor, the electrical length of the second slot structure 212 may be shorter than before the capacitor is connected, and the slot antenna including the second slot structure 212 to which the capacitor is connected can transmit or receive an RF signal of a relatively higher frequency band than before the capacitor is connected.

As another example, in the second state, the switch circuit may open the first switch port and/or the third switch port, in which case the second slot structure 212 may not be electrically connected to the capacitor.

According to an embodiment, the flexible display 220 may occupy most of the front surface of the electronic device 100. For example, the front surface of the electronic device 100 may include the flexible display 220 and a bezel region partially surrounding the edges of the flexible display 220. According to an embodiment, the flexible display 220 may include at least a portion of a flat shape or at least a portion of a curved shape.

According to an embodiment, a portion of the flexible display 220 may be pulled out or inserted into the housing 110 as the second housing 112 moves. In the embodiment of FIG. 2A, only a portion of the flexible display 220 is illustrated, but it may be understood that when viewed in a direction (e.g., the z-direction) facing the front surface of the electronic device 100, the flexible display 220 forms the front surface of the electronic device 100 or is disposed on the front surface.

The slot structures disclosed herein may be referred to using various terms. For example, the slot structures may be referred to as slit structures, and accordingly, a slot antenna may be referred to as a slit antenna.

Figure 2B:
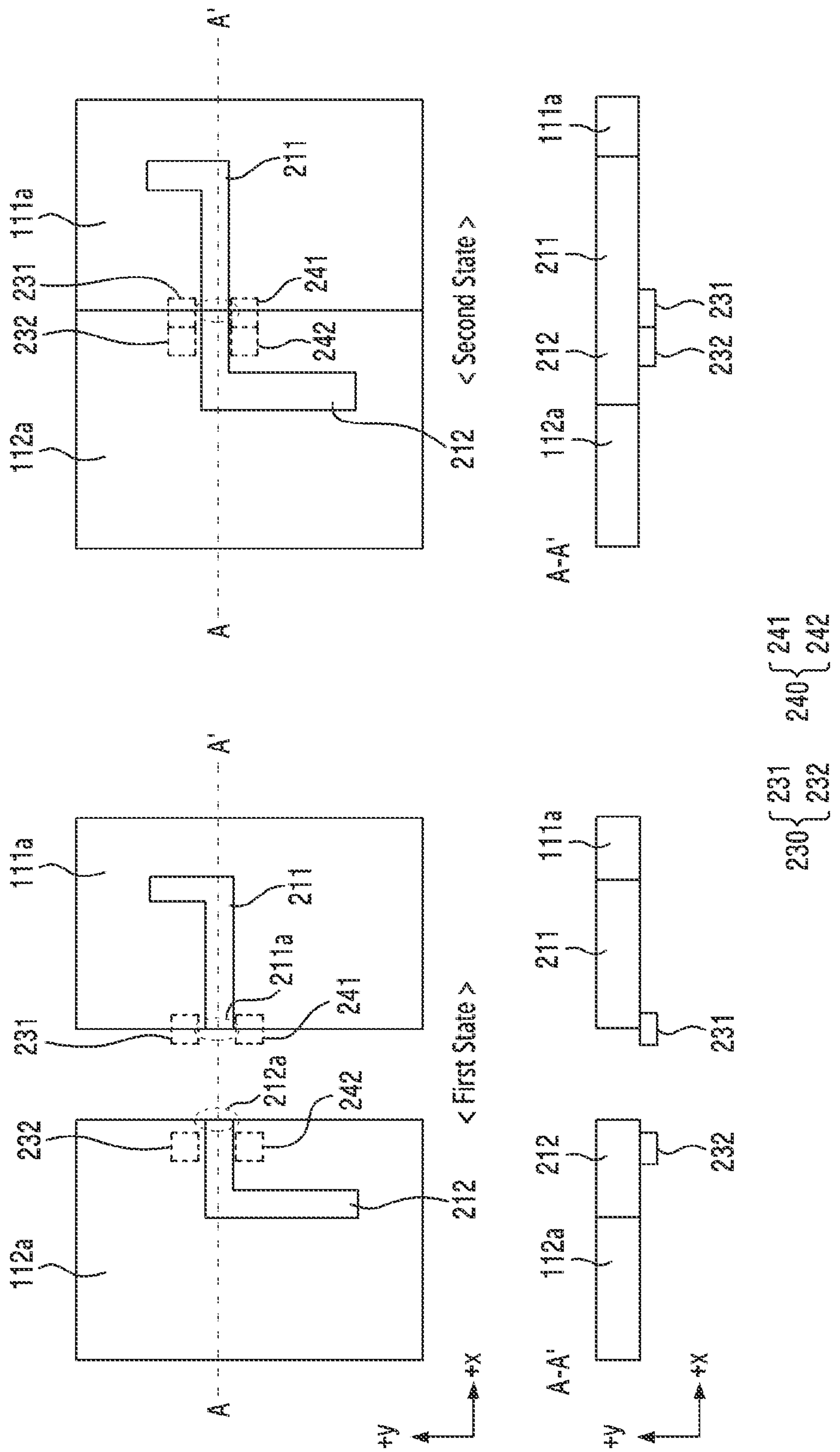
FIG. 2B is a diagram illustrating a first contact structure and a second contact structure when the electronic device is in the first state and the second state, according to an embodiment.

FIG. 2B is a diagram illustrating a first contact structure and a second contact structure when the electronic device is in the first state and the second state, according to an embodiment.

Referring to FIG. 2B, the electronic device 100 includes a first contact structure 230 and a second contact structure 240.

According to an embodiment, the first contact structure 230 may include a first structure 231 and/or a second structure 232. The second contact structure 240 may include a third structure 241 and/or a fourth structure 242. In an embodiment, the first structure 231 may be disposed on the lower surface of the first conductive region 111*a* (e.g., the surface facing the interior of the housing, or the −z direction in FIG. 2A), and the second structure 232 may be disposed on the lower surface of the second conductive region 112*a* (e.g., the surface facing the interior of the housing, or the −z direction of FIG. 2A) corresponding to the position of the first structure 231. In FIG. 2B, the first structure 231 and the second structure 232 are disposed on the lower surface of the first conductive region 111*a* and the lower surface of the second conductive region 112*a*, respectively. However, the first structure 231 and the second structure 232 may be disposed in various other positions. As another example, the third structure 241 of the second contact structure 240 may be disposed on the lower surface of the first conductive region 111*a*, and the fourth structure 242 may be disposed on the lower surface of the second conductive region 112*a*. Similarly, the position of the third structure 241 and/or the position of the fourth structure 242 illustrated in FIG. 2B are exemplary, and each of the third structure 241 and the fourth structure 242 may be disposed at various positions other than the lower surface of the first conductive region 111*a* and the lower surface of the second conductive region 112*a*.

According to an embodiment, as the electronic device 100 is switched from the first state to the second state, the first structure 231 and the second structure 232 of the first contact structure 230, which have been spaced apart from each other, may be coupled to each other. For example, the first structure 231 and/or the second structure 232 may include a C-clip and/or a pogo-pin, and due to the switching from the first state to the second state, the first structure 231 and the second structure 232 may be coupled to each other. As another example, the first structure 231 may include a first magnet, and the second structure 232 may include a second magnet. The first magnet and the second magnet may be different from each other in magnetism. As the first state is switched to the second state, the first magnet and the second magnet having opposite magnetisms may be coupled to each other via a magnetic force. As a further example, as the electronic device 100 is switched from the first state to the second state, the third structure 241 and the fourth structure 242 of the second contact structure 240 may be coupled. In an embodiment, when the first contact structure 230 or the second contact structure 240 is coupled, the first structure 231 and/or the second structure 232 may be electrically connected, and the third structure 241 and/or the fourth structure 242 may be electrically connected.

According to an embodiment, as the first contact structure 230 and/or the second contact structure 240 are coupled in the second state, the first slot structure 211 and the second slot structure 212 may be relatively more stably connected compared to the case in which the first contact structure 230 and/or the second contact structure 240 is not included in the electronic device 100. For example, in the second state, through the coupling, the first contact structure 230 and/or the second contact structure 240 may prevent the first slot structure 211 and the second slot structure 212 from being spaced apart from each other when a physical force is applied to the electronic device 100.

Figure 2C:
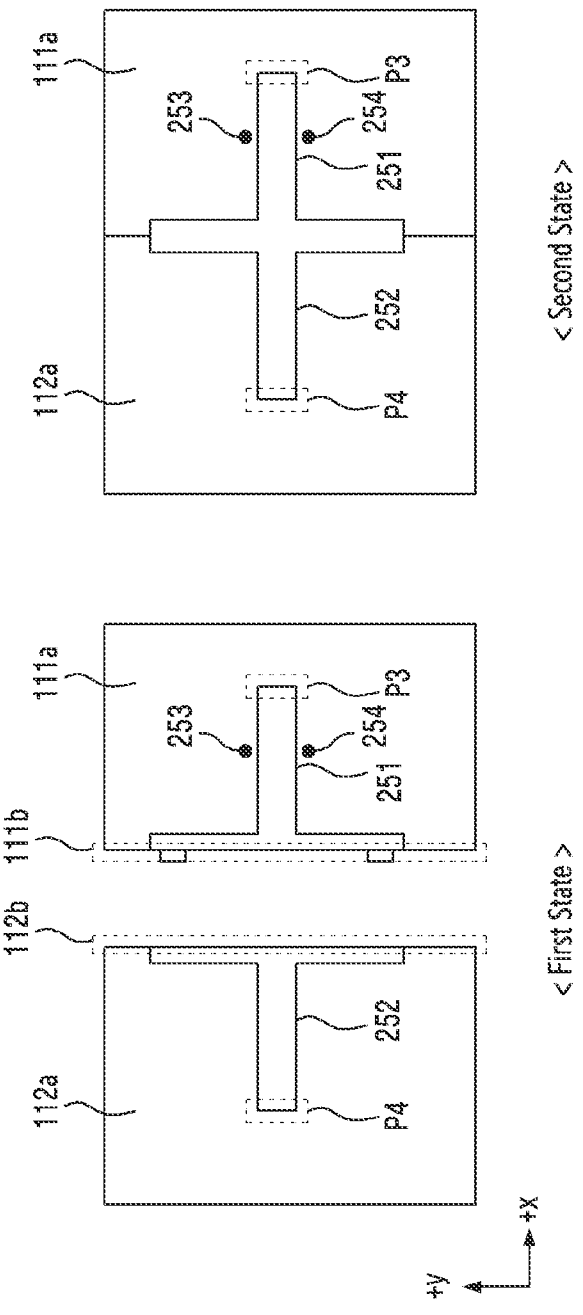
FIG. 2C is a diagram illustrating a first additional slot structure and a second additional slot structure, according to an embodiment.

FIG. 2C is a diagram illustrating a first additional slot structure and a second additional slot structure, according to another embodiment.

Referring to FIG. 2C, according to an embodiment, the electronic device 100 may include a first additional slot structure 251 and a second additional slot structure 252. In an embodiment, the first additional slot structure 251 may include a first portion elongated along the first edge 111*b* and a second portion elongated toward the first edge 111*b* from a third point P3 of the first conductive region 111*a*. As another embodiment, the second additional slot structure 252 may include a third portion elongated along the second edge 112*b* and a fourth portion elongated toward the second edge 112*b* from a fourth point P4 of the second conductive region 112*a*. According to an embodiment, in the second state, the first additional slot structure 251 and the second additional slot structure 252 may be electromagnetically connected to each other. For example, in the second state, the first edge 111*b* of the first housing 111 and the second edge 112*b* of the second housing 112 may be in contact with each other, and the first additional slot structure 251 and the second edge 252 may be electrically connected to each other. As another example, in the second state, the first edge 11*b* of the first housing 111 and the second edge 112*b* of the second housing 112 may be spaced apart from each other but located adjacent to each other within a distance that allows a coupling connection, and the first additional slot structure 251 and the second additional slot structure 252 may be electromagnetically connected to each other via coupling.

Figure 6A:
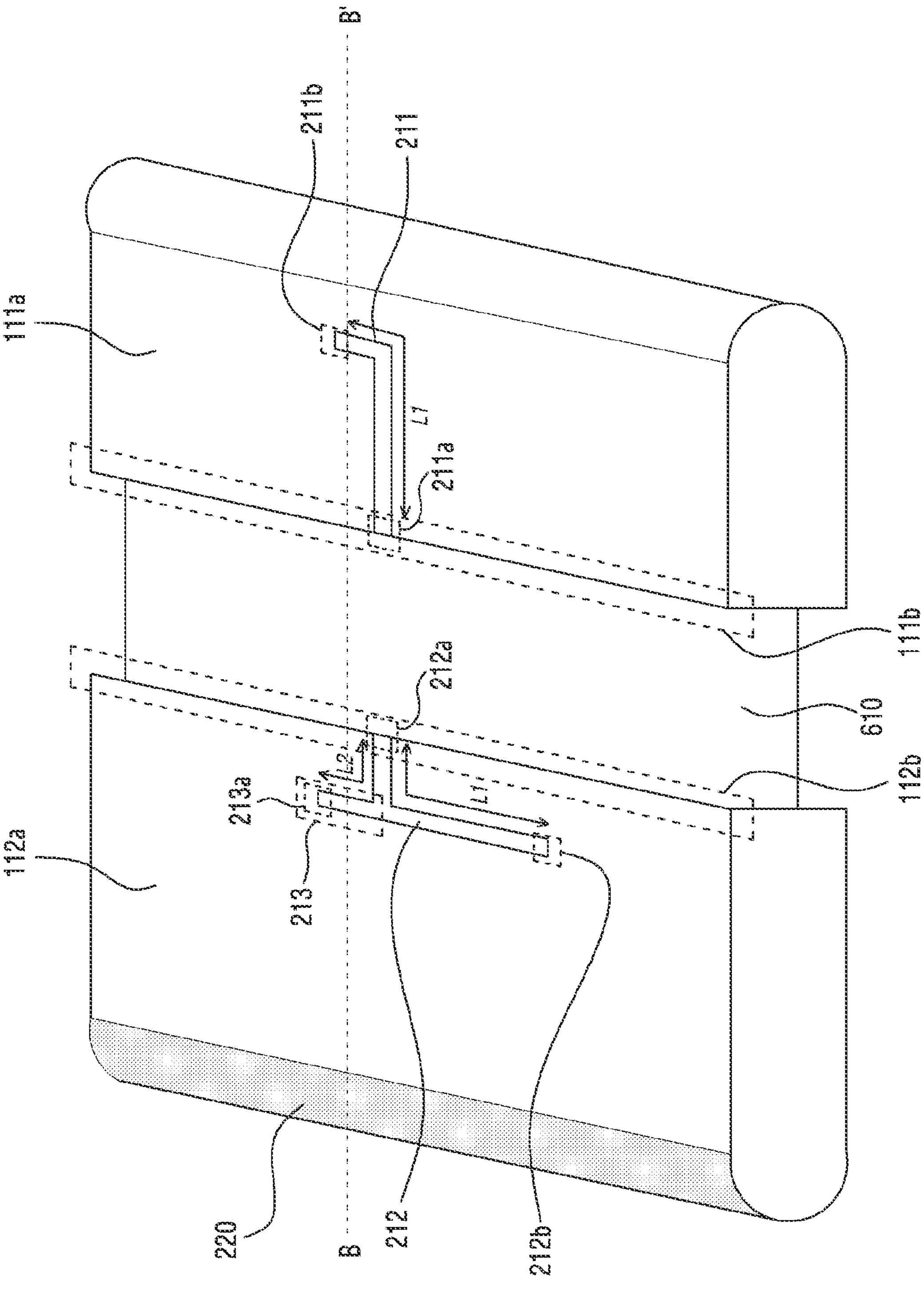
FIG. 6A is a diagram illustrating a third slot structure extending from a point of the second slot structure, according to an embodiment.

According to an embodiment, in the first state and/or the second state, the wireless communication circuit 320 may feed power to a first point 253 of the first additional slot structure 251, and the first additional slot structure 251 may be grounded to the ground of a printed circuit board (PCB) 610 of FIG. 6A at the second point 254. In another embodiment, the position of the first point 253 and/or the position of the second point 254 may vary, and accordingly, the frequency band in which the slot antenna including the first additional slot structure 251 operates may vary.

According to an embodiment, the wireless communication circuit 320 may transmit and/or receive an RF signal of a predetermined frequency band based on the first additional slot structure 251 in the first state. The wireless communication circuit 320 may transmit and/or receive an RF signal of the predetermined frequency band based on the second additional slot structure 252 in the first state. In the second state, the wireless communication circuit 320 may transmit and/or receive an RF signal of the predetermined frequency band, substantially as in the first state, based on the first additional slot structure 251 and the second additional slot structure 252.

According to an embodiment, the wireless communication circuit 320 may transmit and/or receive RF signals of multiple frequency bands based on the first additional slot structure 251 and/or the second additional slot structure 252. For example, in the first state, the second portion of the first additional slot structure 251 may be an open slot structure, and the wireless communication circuit 320 may transmit and/or receive an RF signal of the first frequency band based on an electrical path including the second portion. As another example, in the second state, the first additional slot structure 251 and the second additional slot structure 252 may be electromagnetically connected to each other, and may form a closed slot structure. The wireless communication circuit 320 may transmit and/or receive an RF signal of the second frequency band based on an electrical path including the first additional slot structure 251 and the second additional slot structure 252. According to an embodiment, in the first state, the wireless communication circuit 320 may transmit and/or receive an RF signal of the first frequency band based on an electrical path including the second portion of the first additional slot structure 251, and in a second state the wireless communication circuit 320 may transmit and/or receive an RF signal of the second frequency band based on an electrical path including the first portion and the second portion of the first additional slot structure 251. Accordingly, a slot antenna including the first additional slot structure 251 may operate as a multi-resonant antenna.

Figure 2D:
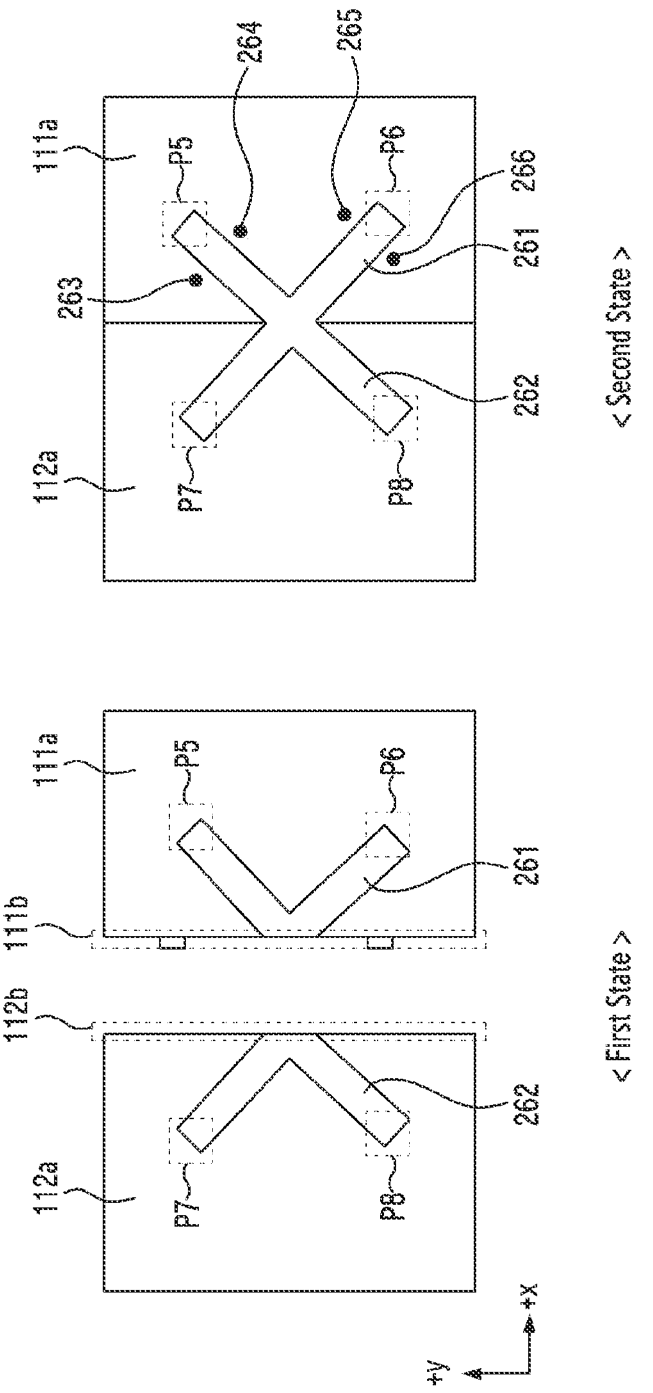
FIG. 2D is a diagram illustrating a third additional slot structure and a fourth additional slot structure, according to another embodiment.

FIG. 2D is a diagram illustrating a third additional slot structure and a fourth additional slot structure, according to another embodiment.

Referring to FIG. 2D, according to an embodiment, the electronic device 100 may include a third additional slot structure 261 and a fourth additional slot structure 262. In an embodiment, the third additional slot structure 261 may have a V-shape. For example, the third additional slot structure 261 may extend from a fifth point P5 to the first edge 111*b*, and may extend from the first edge 111*b* to a sixth point P6. In an embodiment, the length from the fifth point P5 to the first edge 111*b* may be the same as or different from the length from the first edge 111*b* to the sixth point P6. The fourth additional slot structure 62 has a V-shape. the fourth additional slot structure 262 may extend from a seventh point P7 to the first edge 112*b*, and may extend from the second edge 112*b* to an eighth point P8. The length from the seventh point P7 to the second edge 112*b* may be the same as or different from the length from the second edge 112*b* to the eighth point P8. According to an embodiment, in the second state, the third additional slot structure 261 and the fourth additional slot structure 262 may be electromagnetically connected to each other. For example, in the second state, the third additional slot structure 261 and the fourth additional slot structure 262 may have an X-shape.

According to an embodiment, in the first state and/or the second state, the wireless communication circuit 320 may feed power to a first point 263 of the third additional slot structure 261, and the third additional slot structure 261 may be grounded to the ground of the PCB 610 of FIG. 6A at the second point 264. In the first state and/or the second state, the wireless communication circuit 320 may feed power to a third point 265 of the third additional slot structure 261, and the third additional slot structure 261 may be grounded to the ground of the PCB 610 at the fourth point 266. In an embodiment, when the wireless communication circuit 320 feeds power to the first point 263 and/or the third point 265, the first AC signal fed to the first point 263 may have a different polarization direction in order to minimize interference with a second AC signal fed to the third point 265. For example, the first AC signal may correspond to a horizontal polarization, and the second AC signal may correspond to a vertical polarization. In this case, interference due to the energy exchange between the first AC signal and the second AC signal, which are perpendicular to each other, may be minimized.

According to an embodiment, the wireless communication circuit 320 may transmit and/or receive an RF signal of a predetermined frequency band based on the third additional slot structure 261 in the first state. As another example, the wireless communication circuit 320 may transmit and/or receive an RF signal of the predetermined frequency band based on the fourth additional slot structure 262 in the first state. According to an embodiment, in the second state, the wireless communication circuit 320 may transmit and/or receive an RF signal of the predetermined frequency band, substantially as in the first state, based on the third additional slot structure 261 and the fourth additional slot structure 262.

Figure 2E:
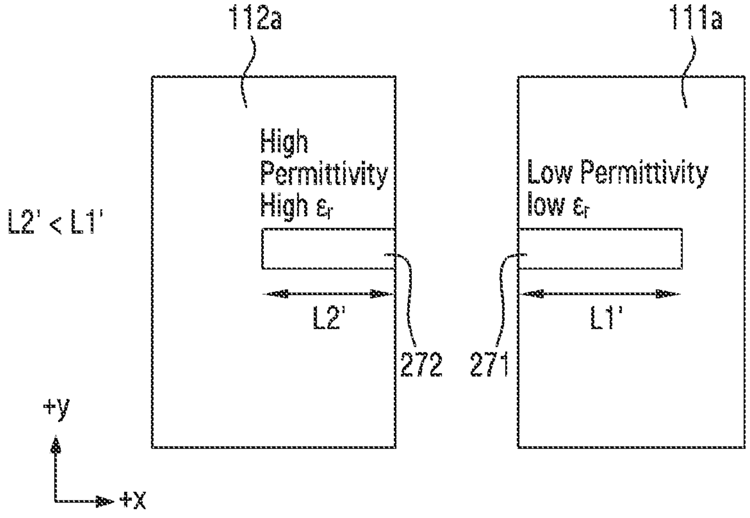
FIG. 2E is a diagram illustrating a fifth additional slot structure and a sixth additional slot structure, according to another embodiment.

FIG. 2E is a diagram illustrating a fifth additional slot structure and a sixth additional slot structure, according to another embodiment.

Referring to FIG. 2E, according to an embodiment, the electronic device 100 may include a fifth additional slot structure 271 and a sixth additional slot structure 272. In an embodiment, the fifth additional slot structure 271 may have a physical length larger than that of the sixth additional slot structure 272. For example, the fifth additional slot structure 271 may have a physical length of L1', and the sixth additional slot structure 272 may have a physical length of L2', which is smaller than L1'. The physical length of the fifth additional slot structure 271 and/or the physical length of the sixth additional slot structure 272 are illustrated as L1' and L2" in FIG. 2E for convenience of description, but are not limited thereto.

In an embodiment, the interior of the fifth additional slot structure 271 and/or the inside of the sixth additional slot structure 272 may be filled with a dielectric material (e.g., injection or air gap). According to an embodiment, the inside of the fifth additional slot structure 271 may be filled with a material having a relative permittivity that is lower than in the interior of the sixth additional slot structure 272. For example, the interior of the fifth additional slot structure 271 may be filled with air, and the interior of the sixth additional slot structure 272 may be filled with injection (e.g., polyethylene).

According to an embodiment, the fifth additional slot structure 271 may have a physical length shorter than that of the sixth additional slot structure 272, and the inside of the sixth additional slot structure 272 may be filled with a dielectric material having a relative permittivity lower than that of the dielectric material filled in the inside of the fifth additional slot structure 271. In this case, the wireless communication circuit 320 may transmit and/or receive an RF signal of a predetermined frequency band based on the fifth additional slot structure 271 in the first state. As another example, the wireless communication circuit 320 may transmit and/or receive an RF signal of the predetermined frequency band based on the sixth additional slot structure 272 in the first state. According to an embodiment, in the second state, the wireless communication circuit 320 may transmit and/or receive an RF signal of the predetermined frequency band substantially as in the first state based on the fifth additional slot structure 271 and the sixth additional slot structure 272.

Figure 3:
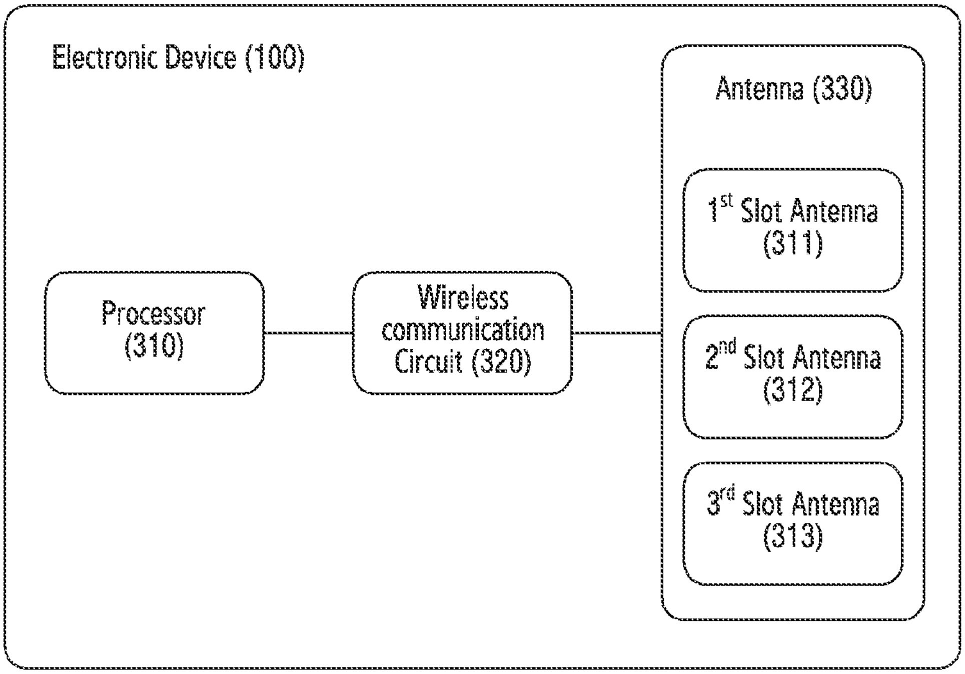
FIG. 3 is a block diagram illustrating an electronic device, according to an embodiment.

FIG. 3 is a block diagram illustrating an electronic device, according to an embodiment.

Referring to FIG. 3, an electronic device 100 according to an embodiment may include a processor 310, a wireless communication circuit 320, and an antenna structure 330.

According to an embodiment, the processor 310 may control the wireless communication circuit 320 to feed power to a point of the first slot structure 211 and/or a point of the second slot structure 212 to transmit or receive an RF signal of a predetermined frequency band.

When the electronic device 100 is in the first state, the wireless communication circuit 320 may feed power to a point of the first slot structure 211 and may transmit or receive an RF signal of a first frequency band based on an electrical path including the first slot structure 211. An antenna including the first slot structure 211 may be referred to as a first slot antenna 331.

For example, when the electronic device 100 is in the first state, the wireless communication circuit 320 may feed power to a point of the second slot structure 212 and may transmit or receive an RF signal of the first frequency band based on an electrical path including the second slot structure 211. An antenna including the second slot structure 212 may be referred to as a second slot antenna 332.

As another example, when the electronic device 100 is in the second state, the wireless communication circuit 320 may feed power to a point of the first slot structure 211 and may transmit or receive a signal of the first frequency band based on an electrical path including the first slot structure 211 and the second slot structure 212. An antenna including the first slot structure 211 and the second slot structure 212 may be referred to as a third slot antenna 333.

In an embodiment, the antenna structure 330 may include various types of antenna structures. For example, the antenna structure 330 may include a patch antenna, a dipole antenna, a monopole antenna, a slot antenna, a loop antenna, an inverted-F antenna, a planar inverted-F antenna and/or an antenna structure in which two or more of these antennas are combined, in addition to the first slot antenna 331, the second slot antenna 332, and/or the third slot antenna 333.

Figure 4A:
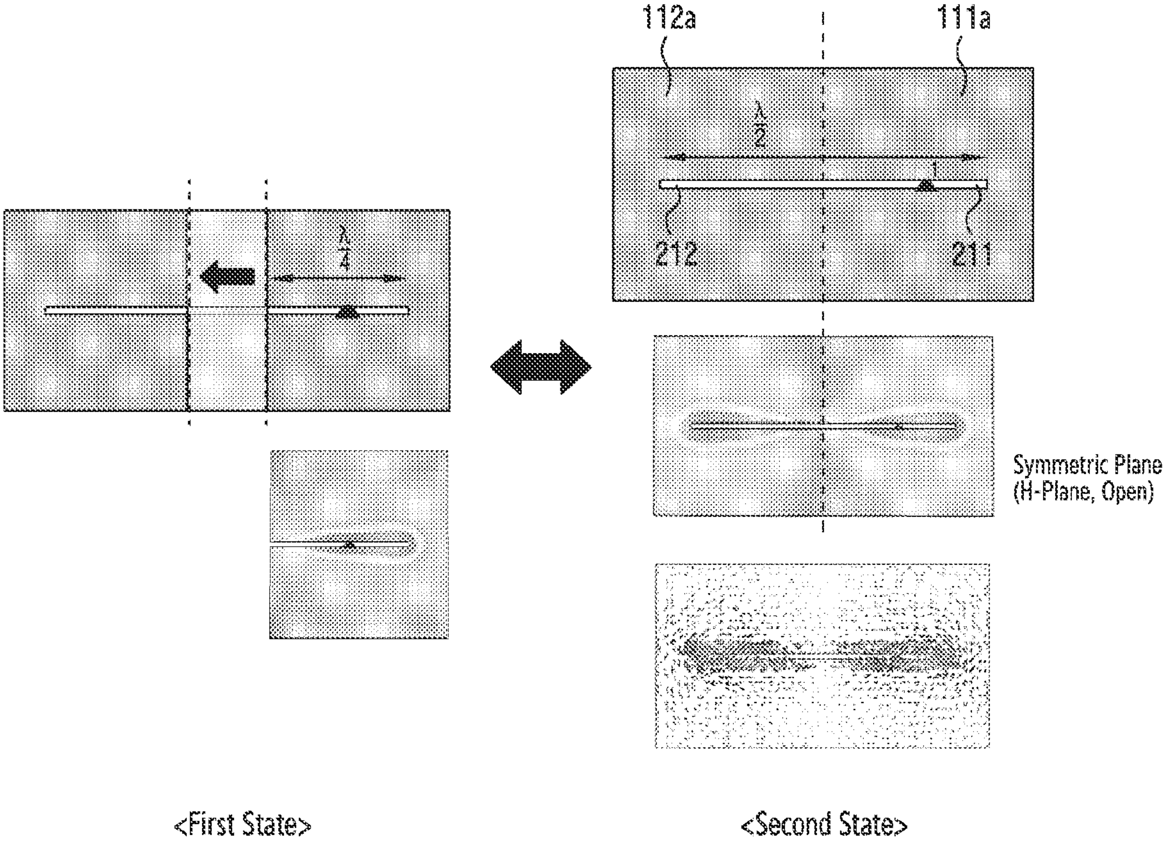
FIG. 4A is a diagram illustrating a slot structure and a current distribution diagram in the first state or the second state, according to an embodiment.

FIG. 4A is a diagram illustrating a slot structure and a current distribution diagram in the first state or the second state, according to an embodiment.

Referring to FIG. 4A, each of the first slot structure 211 and the second slot structure 212 according to an embodiment may have a length corresponding to ¼ wavelength (λ/4).

According to an embodiment, as the wireless communication circuit 320 feeds power to a point of the first slot structure 211 in the first state, a current distribution formed in the first slot structure 211 having a length of ¼ wavelength is illustrated.

According to an embodiment, as the first slot structure 211 and the second slot structure 212 are electrically connected to each other in the second state, a slot structure including the first slot structure 211 and the second slot structure 212 may have a length corresponding to a half wavelength (λ/2).

In an embodiment, as the wireless communication circuit 320 feeds power to a point of the first slot structure 211 in the second state, current distributions formed in the first slot structure 211 and the second slot structure 212 are illustrated. According to an embodiment, the second slot structure 212 may have a symmetrical current distribution symmetrical to that in the first slot structure 211.

According to an embodiment, through the symmetrical current distributions, even in the second state, the wireless communication circuit 320 may transmit and/or receive a signal having a frequency band that is substantially the same as that in the first state.

Figure 4B:
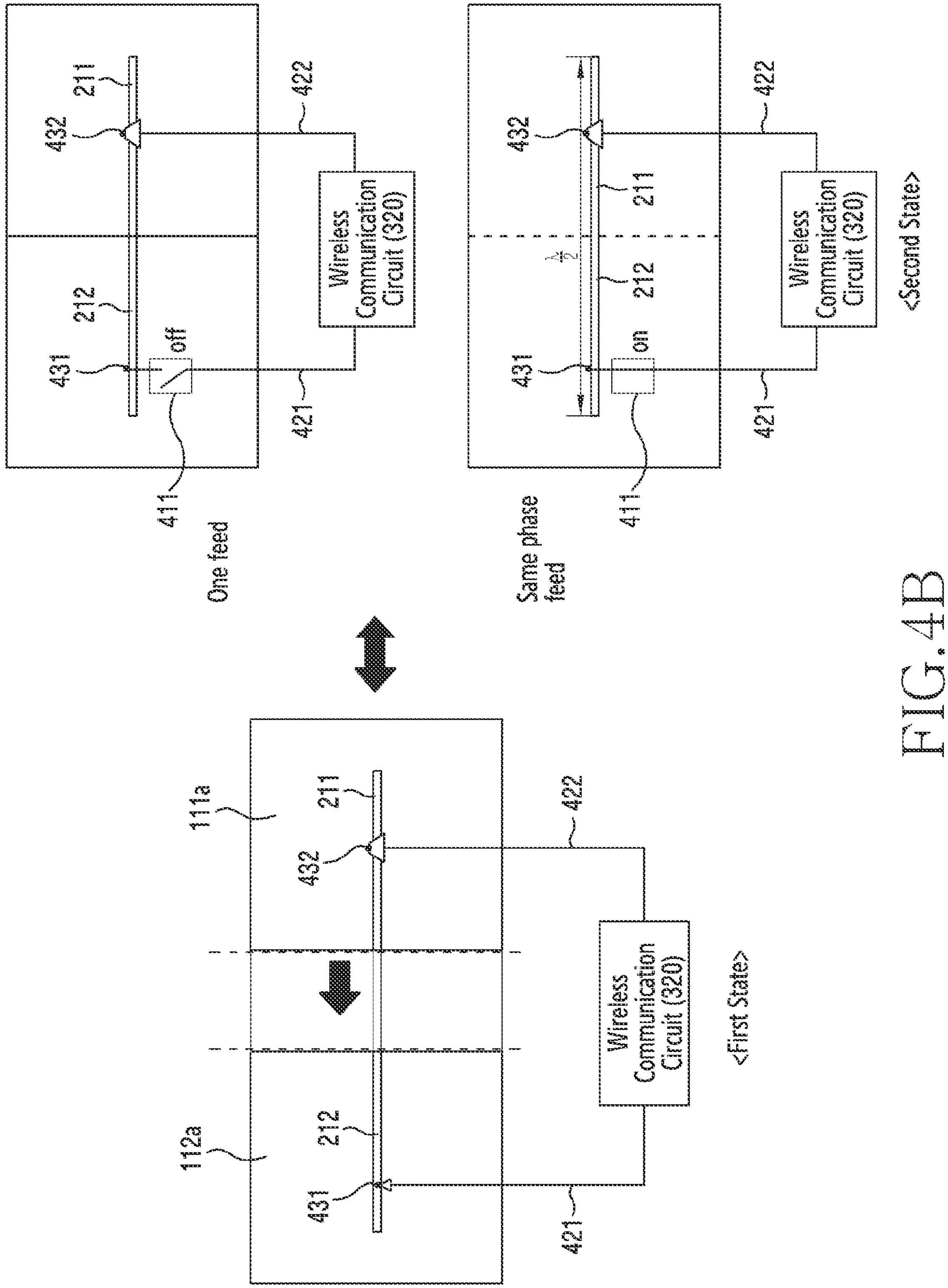
FIG. 4B is a diagram illustrating various ways in which a wireless communication circuit feeds power to a slot structure, according to an embodiment.

FIG. 4B is a diagram illustrating various ways in which a wireless communication circuit feeds power to a slot structure, according to an embodiment.

Referring to FIG. 4B, the wireless communication circuit 320 may feed power to a point of the first slot structure 211 and/or a point of the second slot structure 212 in the first state. For example, the wireless communication circuit 320 may feed power to a first feed point 431 of the first slot structure 211 via a first feed path 421 in the first state. As another example, the wireless communication circuit 320 may feed power to a second feed point 432 of the second slot structure 212 via a second feed path 422 in the first state. For example, the first slot antenna 331 may include the first slot structure 211. As another example, the second slot antenna 332 may include the second slot structure 212. As another example, the third slot antenna 333 may include the first slot structure 211 and the second slot structure 212.

According to an embodiment, the electronic device 100 may include a matching circuit 411, and the matching circuit 411 may be electrically connected to the second feed path 422. In an embodiment, the wireless communication circuit 320 may feed power in various ways using the matching circuit 411 in the second state. In an embodiment, the matching circuit 411 may include a switch or a lumped element. For example, in the second state, the matching circuit 411 may open a switch port connected to the second feed path 422. In this case, the wireless communication circuit 320 may feed power to the first feed point 431 of the first slot structure 211 via the first feed path 421. As another example, in the second state, the matching circuit 411 may short a switch port connected to the second feed path 422. In this case, as in the first state, the wireless communication circuit 320 may feed power to the first feed point 431 via the first feed path 421 and may feed power to the second feed point 432 via the second feed path 422. In an example, the wireless communication circuit 320 may feed power to the first feed point 431 and the second feed point 432 in the same phase, and as a result, the third slot antenna 333 based on the first slot structure 211 and the second slot structure 212 may have improved radiation efficiency. As another example, the frequency band may be changed using a lumped element included in the matching circuit 411.

Figure 5:
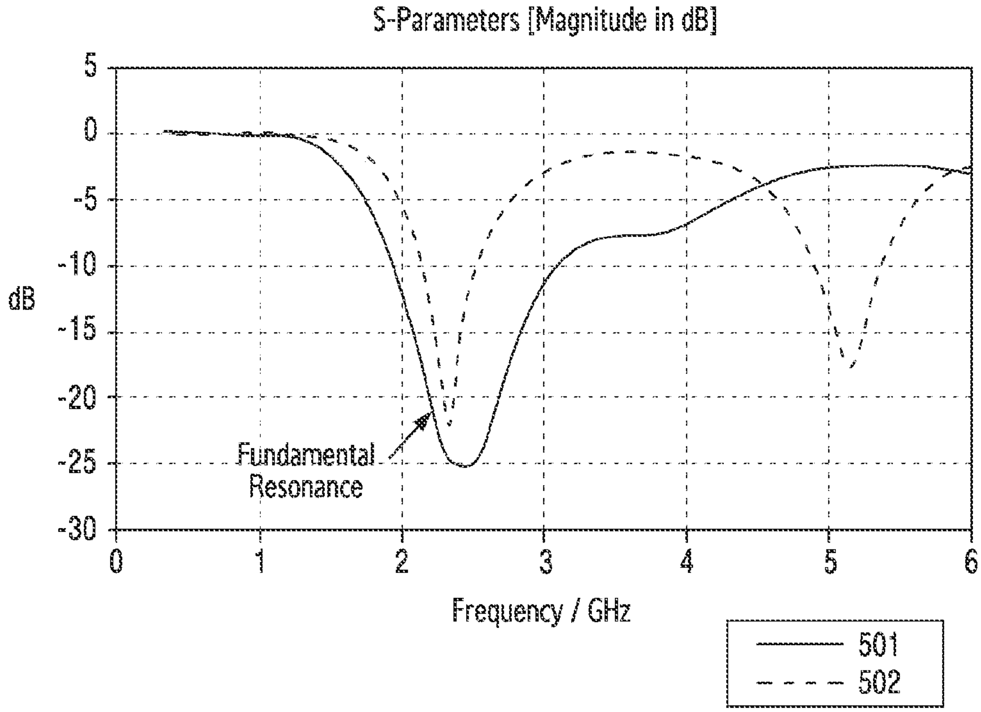
FIG. 5 is a diagram illustrating a reflection coefficient graph of an antenna including a slot structure in the first state or the second state, according to an embodiment.

FIG. 5 is a diagram illustrating a reflection coefficient graph of an antenna including a slot structure in the first state or the second state, according to an embodiment.

Referring to FIG. 5, when the electronic device 100 is in the first state, a reflection coefficient graph 501 of the first slot antenna 331 including the first slot structure 211 of FIG. 4A (hereinafter, referred to as a first state graph) has a reflection coefficient value of about −20 to −25 dB in a first frequency band of about 2.2 to 2.5 GHz.

According to an embodiment, when the electronic device 100 is in the second state, a reflection coefficient graph 502 of the third slot antenna 333 including the first slot structure 212 and the second slot structure 212 (hereinafter, referred to as a second state graph) has a reflection coefficient value of about −15 to −20 dB in the first frequency band of about 2.2 to 2.5 GHz. The second state graph 502 has a reflection coefficient value of about −15 to 10 dB in the second frequency band of about 4.9 to 5.4 GHz.

According to an embodiment, in the first state, the wireless communication circuit 320 may transmit and/or receive an RF signal of the first frequency band (e.g., about 2.2 to 2.5 GHz) based on an electrical path including the first slot structure 211.

According to an embodiment, when the electronic device 100 is in the second state, the first slot structure 211 and the second slot structure 212 having substantially the same electrical length as the first slot structure 211 may be electrically connected to each other. In this case, the wireless communication circuit 320 may transmit or receive an RF signal in the first frequency band (e.g., about 2.2 to 2.5 GHz) substantially as in the first state based on the electrical path including the first slot structure 211 and the second slot structure 212.

According to an embodiment, when the electronic device 100 is in the second state, the wireless communication circuit 320 may transmit and/or receive an RF signal of the second frequency band (e.g., about 4.9 to 5.4 GHz) corresponding to a harmonic frequency of the first frequency band based on an electrical path including the first slot structure 211 and the second slot structure 212.

FIG. 6A is a diagram illustrating a third slot structure extending from a point of the second slot structure, according to an embodiment.

Referring to FIG. 6A, the electronic device 100 may include a PCB 610. A plurality of electronic components may be disposed on the PCB 610. For example, the processor 310, the wireless communication circuit 320, a memory (e.g., the memory 930 of FIG. 9), and a control circuit and/or an interface (e.g., the interface 977 of FIG. 9) may be placed on the PCB 610. The PCB 610 may be a printed circuit board made of a material having a non-bendable property (e.g., FR4). The PCB 610 may be a flexible PCB (FPCB) having a bendable or flexible property.

According to an embodiment, the second conductive region 112*a* of the second housing 112 may include a third slot structure 213. In an embodiment, the third slot structure 213 may extend from a point of the second slot structure 212. In an embodiment, the third slot structure 213 may have various shapes (e.g., a linear shape, an L shape, or a diagonal shape). In an embodiment, the shape of the third slot structure 213 may vary depending on the operating frequency of the antenna including the third slot structure 213. In FIG. 6A, the third slot structure 213 is shown as extending from a point of the second slot structure 212, but the third slot structure 213 may be a portion of the second slot structure 212. For example, the second slot structure 212 illustrated in FIG. 6A may be described as a first portion of the second slot structure 212, and the third slot structure 213 may be described as a second portion extending from the first portion of the second slot structure 212.

In an embodiment, the length from the second end 212*a* of the second slot structure 212 to a third end 213*a* of the third slot structure 213 may be a second length L2. According to an embodiment, the second length L2 may be shorter than the first length L1. However, the disclosure is not limited thereto, and the second length L2 may vary depending on the operating frequency of the slot antenna including the third slot structure 213.

According to an embodiment, in the first state, the wireless communication circuit 320 may transmit and/or receive an RF signal of the second frequency band that is higher than the first frequency band based on an electrical path including the third slot structure 213. For example, since the second length L2 is shorter than the first length L1, the wireless communication circuit 320 may transmit or receive an RF signal of the second frequency band (e.g., about 4.9 to 5.5 GHz) higher than the first frequency band (e.g., about 2.2 to 2.5 GHz).

According to another embodiment, the electronic device 100 may include a lumped element, and the lumped element may be electrically connected to the third slot structure 213. In this case, the wireless communication circuit 320 may transmit or receive an RF signal of the third frequency band. For example, a capacitor may be electrically connected to the third slot structure 213. In this case, the wireless communication circuit 320 may transmit and/or receive an RF signal of the third frequency band higher than the second frequency band based on an electrical path including the third slot structure 213 and the capacitor.

According to another embodiment, the electronic device 100 may include a fourth slot structure and/or a fifth slot structure). In an embodiment, the fourth slot structure may extend along the first edge 111*b* of the first housing 111 with a predetermined length.

In an embodiment, the fifth slot structure may extend along the second edge 112*b* of the second housing 112 with the same length as the fourth slot structure. In an embodiment, in the first state, the wireless communication circuit 320 may transmit and/or receive an RF signal of the fourth frequency band by feeding power to a point of the fourth slot structure and/or a point of the fifth slot structure.

In an embodiment, in the second state, the fourth slot structure and the fifth slot structure may be electrically connected to each other by being in contact with each other, or may be adjacent to each other within a predetermined distance and may be electromagnetically connected by a coupling method. In an embodiment, in the second state, the wireless communication circuit 320 may transmit and/or receive an RF signal of the fourth frequency band based on an electrical path including the fourth slot structure and the fifth slot structure.

Figure 6B:
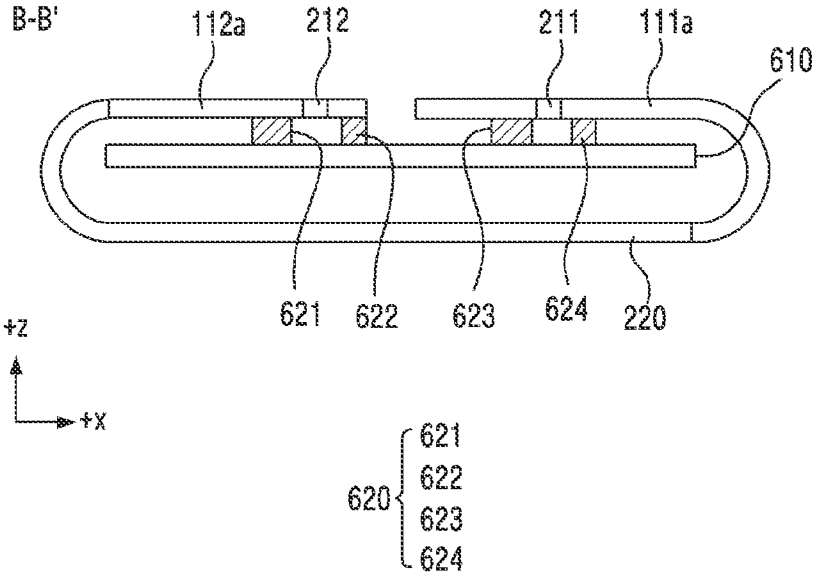
FIG. 6B is a diagram illustrating a cross-sectional view of an electronic device taken along line B-B', according to an embodiment.

FIG. 6B is a diagram illustrating a cross-sectional view of an electronic device taken along line B-B' of FIG. 6A, according to an embodiment.

Referring to FIG. 6B, the electronic device 100 may include conductive connection members 620 (e.g., C-clips). Among the conductive connection members 620, a first conductive connection member 621 and/or a second conductive connection member 622 may be disposed between the PCB 610 and the second conductive region 112*a*. The wireless communication circuit 320 disposed on the PCB 610 may feed power to a point of the second slot structure 212 via the first conductive connection member 621. The PCB 610 may include a plurality of conductive layers, and at least some of the plurality of conductive layers may include a ground. The ground of the PCB 610 may be electrically connected to a point of the second slot structure 212 via the second conductive connection member 622.

According to an embodiment, among the conductive connection members 620, a third conductive connection member 623 and a fourth conductive connection member 624 may be disposed between the PCB 610 and the first conductive region 111*a*. The wireless communication circuit 320 disposed on the PCB 610 may feed power to a point of the first slot structure 211 via the third conductive connection member 623. The printed circuit board 610 may include a plurality of conductive layers, and at least some of the plurality of conductive layers may include a ground. The ground of the PCB 610 may be electrically connected to a point of the first slot structure 211 via the fourth conductive connection member 624.

Figure 6C:
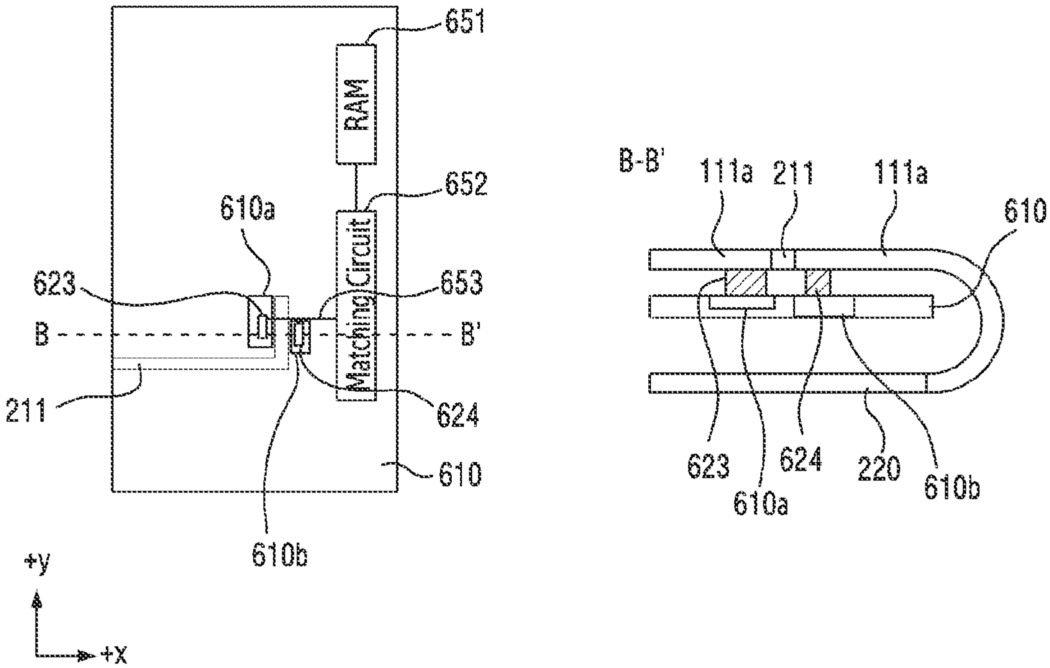
FIG. 6C is a diagram illustrating a feed path and a grounding path of the first slot structure of FIG. 6B, according to an embodiment.

FIG. 6C is a diagram illustrating a feed path and a grounding path of the first slot structure of FIG. 6B, according to an embodiment.

The first slot structure 211 is illustrated as being formed on the PCB 610 as the first conductive region 111*a* is transparently illustrated in FIG. 6C. However, this is for describing the structure of the PCB 610 disposed below the first conductive region 111*a*, and the first slot structure is substantially disposed in the first conductive region 111*a* as illustrated in the cross-sectional view taken along line B-B'.

Referring to FIG. 6C, the electronic device 100 may include a pulse amplitude modulation (PAM) 651, and the PAM 651 may be disposed on the PCB 610. In an embodiment, the PCB 610 may include an island portion 610*a* for feeding power to the first slot structure 211, and the island portion 610*a* may be electrically connected to the first point 654 of the first slot structure 211 via the third conductive connection member 623. For example, the island portion 610*a* may include a fill-cut region. In an embodiment, a matching circuit 652 for impedance matching may be disposed on the PCB 610 to be connected to a feed path 653, which connects the PAM 651 and the island portion 610*a* to each other.

According to an embodiment, the PAM 651 may feed power to the first point 654 of the first slot structure 211 via the feed path 653, the island portion 610*a,* and/or the third conductive connection member 623.

According to an embodiment, the PCB 610 may include a ground 610*b,* and the first slot structure 211 may be grounded to a ground 610 via the fourth conductive connection member 624 at the second point 655. In an embodiment, the first point 654 and the second point 655 may be disposed in opposite directions with respect to the first slot structure 211. In this case, a potential difference may be formed between the first point 654 and the second point 655.

According to another embodiment, the wireless communication circuit 320 may feed power to the second point 655 via the fourth conductive connection member 624. For example, the wireless communication circuit 320 may feed power of a positive potential to the first point 654 via the third conductive connection member 623 and may feed power of a negative potential to the second point 655 via the fourth conductive connection member 624. In this case, a potential difference may be formed between the first point 654 and the second point 655.

Figure 6D:
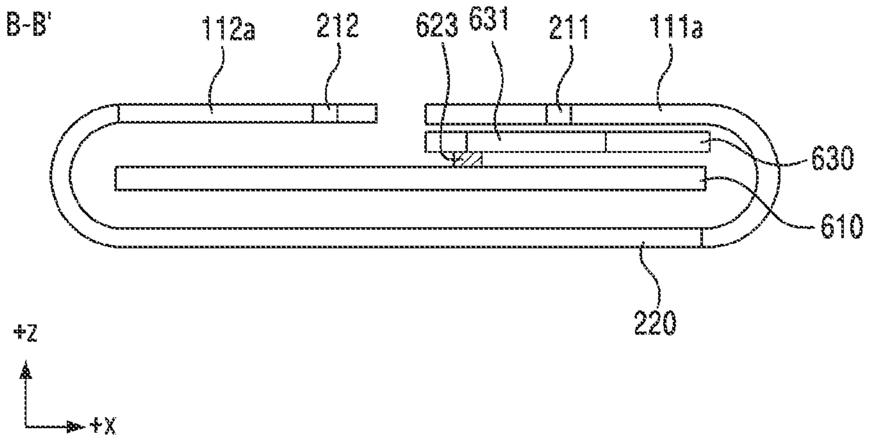
FIG. 6D is a diagram illustrating a cross-sectional view of an electronic device taken along line B-B', according to another embodiment.

FIG. 6D is a diagram illustrating a cross-sectional view of an electronic device taken along line B-B' of FIG. 6A, according to another embodiment.

Referring to FIG. 6D, the electronic device 100 may include an FPCB 630, and the FPCB 630 may include a conductive pattern 631. In an embodiment, the electronic device 100 may include a third conductive connection member 623, and the third conductive connection member 623 may be disposed between the PCB 610 and the FPCB 630. The wireless communication circuit 320 disposed on the PCB 610 may be electrically connected to the conductive pattern 631 via the third conductive connection member 623. The wireless communication circuit 320 may be coupled to a point of the first slot structure 211 at the conducive pattern to feed power to the point. For example, the conductive pattern 631 may be disposed to be coupled to the first slot structure 211.

According to another embodiment, the conductive pattern 631 may be formed through a laser direct structuring (LDS) method. According to another embodiment, the conductive pattern 631 may be formed through various methods. For example, the conductive pattern 631 may be formed of stainless steel (STS) or formed through a vapor deposition method.

Figure 6E:
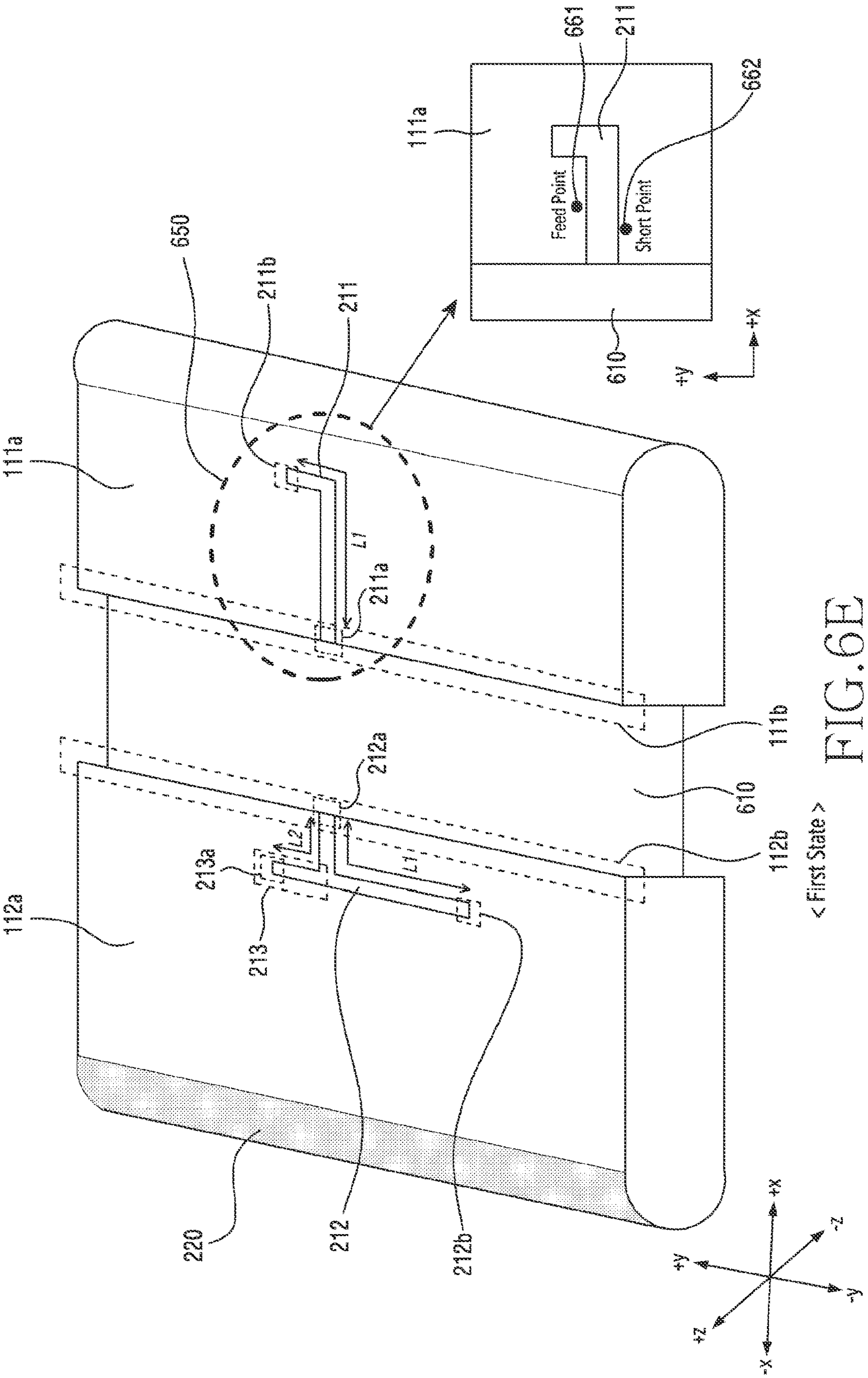
FIG. 6E is a diagram illustrating a feed point and a ground point of the first slot structure, according to an embodiment.

FIG. 6E is a diagram illustrating a feed point and a ground point of the first slot structure, according to an embodiment.

Referring to FIG. 6E, an enlarged view of portion 650 including the first slot structure 211 is illustrated.

According to an embodiment, the wireless communication circuit 320 disposed on the PCB 610 may feed power to feed point 661 of the first slot structure 211. For example, the wireless communication circuit 320 may feed power to the feed point 661 of the first slot structure 211 via the second conductive connection member (e.g., the second conductive connection member 622 in FIG. 6B).

According to an embodiment, the PCB 610 may include a plurality of conductive layers, and at least some of the plurality of conductive layers may include a ground. A ground of the PCB 610 may be electrically connected to a ground point 662 of the first slot structure 211. According to an embodiment, by changing the position of the ground point 662, the first slot structure 211 may have various electrical paths, and the wireless communication circuit 320 may transmit and/or receive an RF signal of a frequency band corresponding to each electrical path based on the various electrical paths.

Figure 6F:
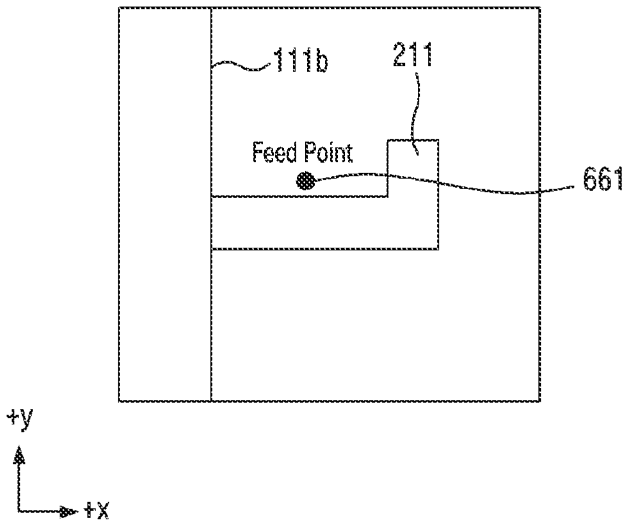
FIG. 6F is a diagram in which the ground point is omitted from FIG. 6D, according to an embodiment.

FIG. 6F is a diagram in which the ground point is omitted in the embodiment of FIG. 6E, according to an embodiment.

Referring to FIG. 6F, the ground point 662 is omitted compared with FIG. 6E. the first slot structure 211 may have an electrical path extending from the feed point 661 to the first edge (e.g., the first edge 111*b* of FIG. 6D), and the wireless communication circuit 320 may transmit and/or receive an RF signal of a predetermined frequency band based on the electrical path.

Figure 6G:
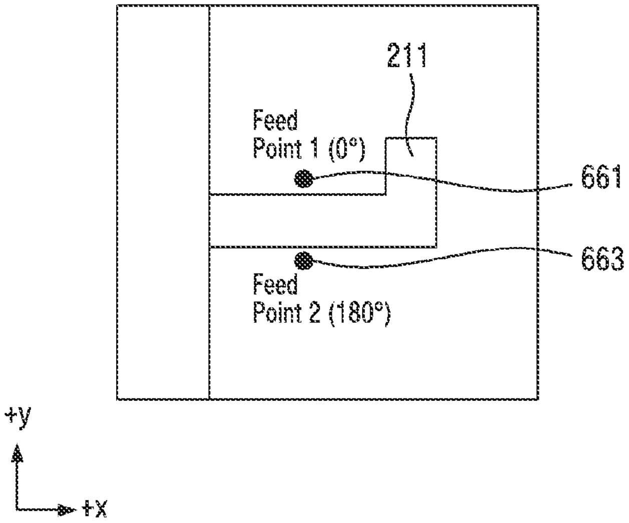
FIG. 6G is a diagram illustrating a feed point and an additional feed point for the first slot structure, according to an embodiment.

FIG. 6G is a diagram illustrating a feed point and an additional feed point for the first slot structure, according to an embodiment.

Referring to FIG. 6G, according to an embodiment, the wireless communication circuit 320 may feed power to the feed point 661 and an additional feed point 663 of the first slot structure 211. In an embodiment, the additional feed point 663 may be a point at which a first voltage fed from the feed point 661 has a phase opposite to that of the feed point 661. For example, when the phase of the first voltage fed to the feed point 661 is 0°, the first voltage may have a phase of 180° at the additional feed point 663.

According to an embodiment, the wireless communication circuit 320 may additionally feed power to the additional feed point 663, and in this case, a second voltage fed to the additional feed point 663 may have a phase (e.g., 180°) opposite to the phase (e.g., 0°) of the voltage fed to the feed point 661. Accordingly, the first voltage and the second voltage may have the same phase (e.g., 180°) at the additional feed point 663, and the voltage is strengthened so that the first slot antenna 331 including the first slot structure 211 can be improved.

Figure 7A:
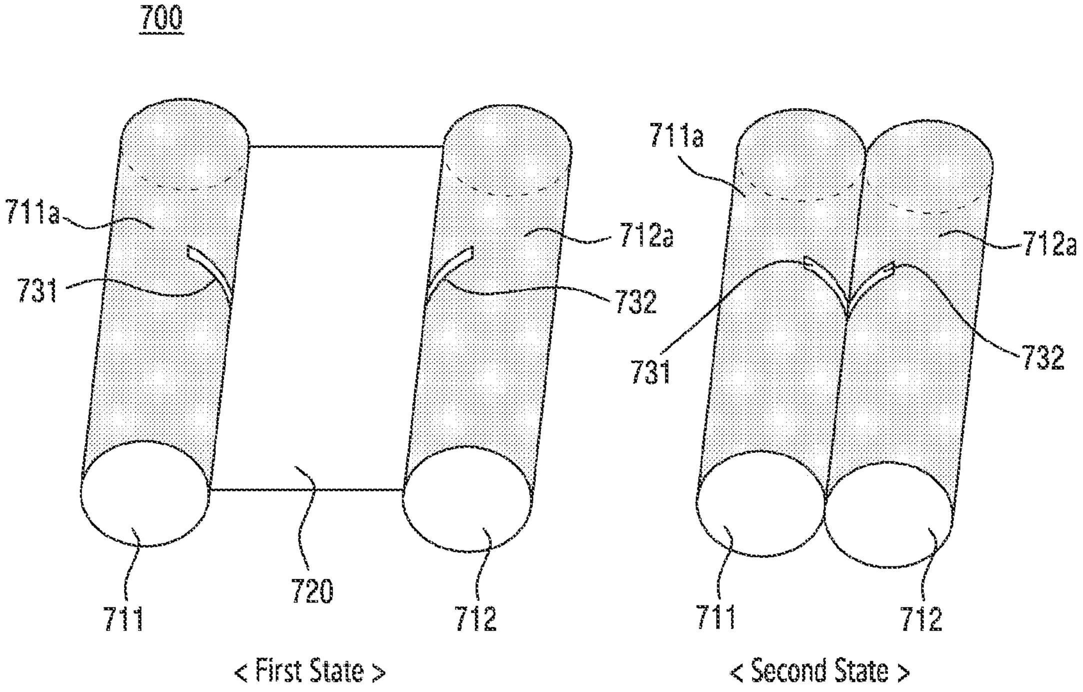
FIG. 7A is a diagram illustrating a rollable electronic device including a slot structure, according to another embodiment.

FIG. 7A is a diagram illustrating a rollable electronic device including a slot structure, according to another embodiment.

Referring to FIG. 7A, the rollable electronic device 700 according to an embodiment may include a first housing 711, a second housing 712, and a flexible display 720.

According to an embodiment, when the rollable electronic device 700 is in the first state, the first housing 911 and the second housing 912 may be disposed to be spaced apart from each other by a predetermined distance or more. In an embodiment, in the first state, at least a portion of the flexible display 720 may be pulled out from at least one of the first housing 711 and the second housing 712 to be visually recognized to the outside.

According to an embodiment, when the rollable electronic device 700 is in the second state, the first housing 711 and the second housing 712 may be in contact with each other or disposed adjacent to each other within a predetermined distance. In an embodiment, in the second state, at least a portion of the flexible display 720 may not be visually recognized by being inserted into at least one of the first housing 711 and the second housing 712.

According to an embodiment, A first conductive region 711*a* of the first housing 711 may include a sixth slot structure 731, and a second conductive region 712*a* of the second housing 712 may include a seventh slot structure 732.

According to an embodiment, the sixth slot structure 731 and the seventh slot structure 732 may have substantially the same physical length.

In an embodiment, the sixth slot structure 731 and the seventh slot structure 732 may have different physical lengths. In an embodiment, even if the physical lengths of the sixth slot structure 731 and the seventh slot structure 732 are different from each other, it is possible to make the sixth slot structure 731 and the seventh slot structure 732 have substantially the same electrical length in terms of RF by electrically connecting a lumped element or an impedance matching circuit to the seventh slot structure 732.

According to an embodiment, when the rollable electronic device 700 is in the first state, the wireless communication circuit may transmit or receive an RF signal of a fifth frequency band based on an electrical path including the sixth slot structure 731. In an embodiment, the fifth frequency band may vary depending on the length and/or shape of the sixth slot structure 731 and the seventh slot structure 732.

According to an embodiment, when the rollable electronic device 700 is in the second state, the wireless communication circuit may transmit or receive an RF signal of the fifth frequency band substantially as in the first state based on an electrical path including the sixth slot structure 731 and the seventh slot structure 732. For example, when the rollable electronic device 700 is in the second state, in the wireless communication circuit, the sixth slot structure 731 and the seventh slot structure 732 may be electromagnetically connected to each other.

Figure 7B:
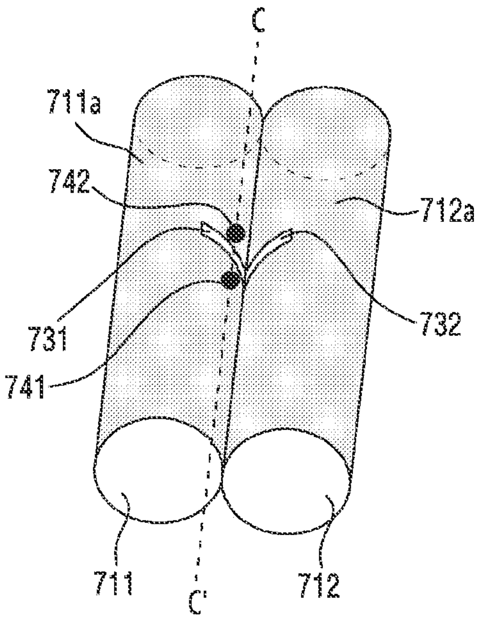
FIG. 7B is a diagram illustrating a cross-sectional view of a first housing taken along line C-C', according to an embodiment.
Figure 7B:
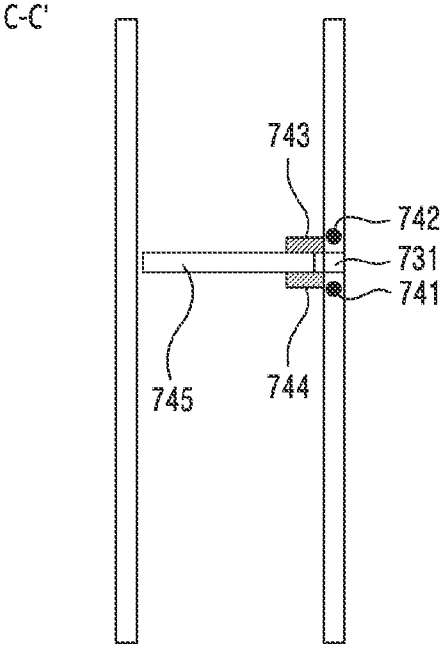

FIG. 7B is a diagram illustrating a cross-sectional view of a first housing 711 taken along line C-C', according to an embodiment.

Referring to FIG. 7B, the rollable electronic device 700 may include a PCB 745, and a plurality of electronic components (e.g., the wireless communication circuit) may be disposed on the PCB 745. The PCB 745 may include a plurality of conductive layers, and at least some of the plurality of conductive layers may include a ground.

According to an embodiment, the wireless communication circuit disposed on the PCB 745 may feed power to a first point 741 of the sixth slot structure 731 via a first conductive connection member 744. A second point 742 of the sixth slot structure 731 may be electrically connected to a ground of the PCB 745 via a second conductive connection member 743.

Figure 7C:
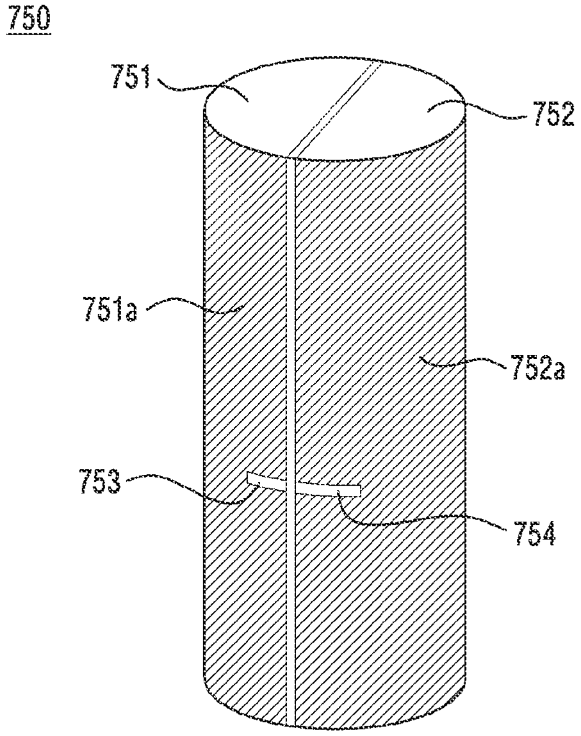
FIG. 7C is a diagram illustrating a rollable electronic device including an eighth slot structure and a ninth slot structure, according to another embodiment.

FIG. 7C is a diagram illustrating a rollable electronic device including an eighth slot structure and a ninth slot structure, according to another embodiment.

Referring to FIG. 7C, a rollable electronic device 750 may include a first housing 751 and a second housing 752.

According to an embodiment, when the rollable electronic device 750 is in the first state, the first housing 751 and the second housing 752 may be disposed to be spaced apart from each other by a predetermined distance or more. According to an embodiment, when the rollable electronic device 750 is in the second state, the first housing 751 and the second housing 752 may be in contact with each other or disposed adjacent to each other within a predetermined distance.

According to an embodiment, A first conductive region 751*a* of the first housing 751 may include an eighth slot structure 753, and a second conductive region 752*a* of the second housing 752 may include a ninth slot structure 754. In an embodiment, in the first state, the wireless communication circuit may transmit and/or receive an RF signal of a predetermined frequency band by feeding power to the eighth slot structure 753 and/or the ninth slot structure 754. In the second state, the eighth slot structure 753 may be electromagnetically connected to the ninth slot structure 754, and the wireless communication circuit may transmit and/or receive an RF signal of the frequency band, substantially the same as that in the first state, based on the eighth slot structure 753 and the ninth slot structure 754.

Figure 7D:
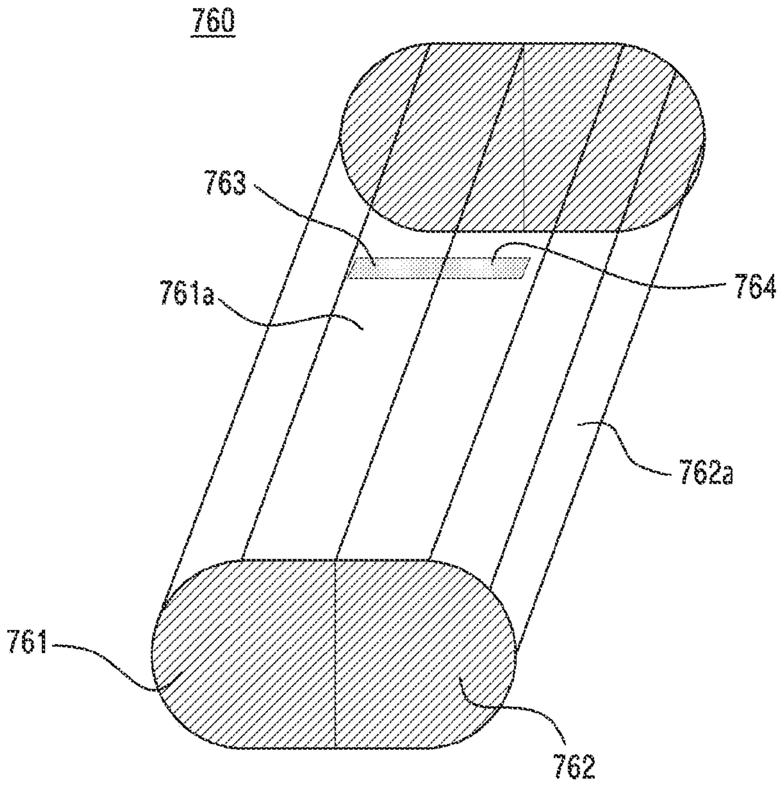
FIG. 7D is a diagram illustrating a rollable electronic device including a tenth slot structure and an eleventh slot structure, according to another embodiment.

FIG. 7D is a diagram illustrating a rollable electronic device including a tenth slot structure and an eleventh slot structure, according to another embodiment.

Referring to FIG. 7D, a rollable electronic device 760 includes a first housing 761 and a second housing 762.

According to an embodiment, when the rollable electronic device 760 is in the first state, the first housing 761 and the second housing 762 may be disposed to be spaced apart from each other by a predetermined distance or more. According to an embodiment, when the rollable electronic device 760 is in the second state, the first housing 761 and the second housing 762 may be in contact with each other or disposed adjacent to each other within a predetermined distance.

According to an embodiment, the first conductive region 761*a* of the first housing 761 may include a tenth slot structure 763, and a second conductive region 762*a* of the second housing 762 may include an eleventh slot structure 764. In an embodiment, in the first state, the wireless communication circuit may transmit and/or receive an RF signal of a predetermined frequency band by feeding power to the tenth slot structure 763 and/or the eleventh slot structure 764. In the second state, the tenth slot structure 763 may be electromagnetically connected to the eleventh slot structure 764, and the wireless communication circuit may transmit and/or receive an RF signal of the frequency band, substantially the same as that in the first state, based on the tenth slot structure 763 and the eleventh slot structure 764.

Figure 7E:
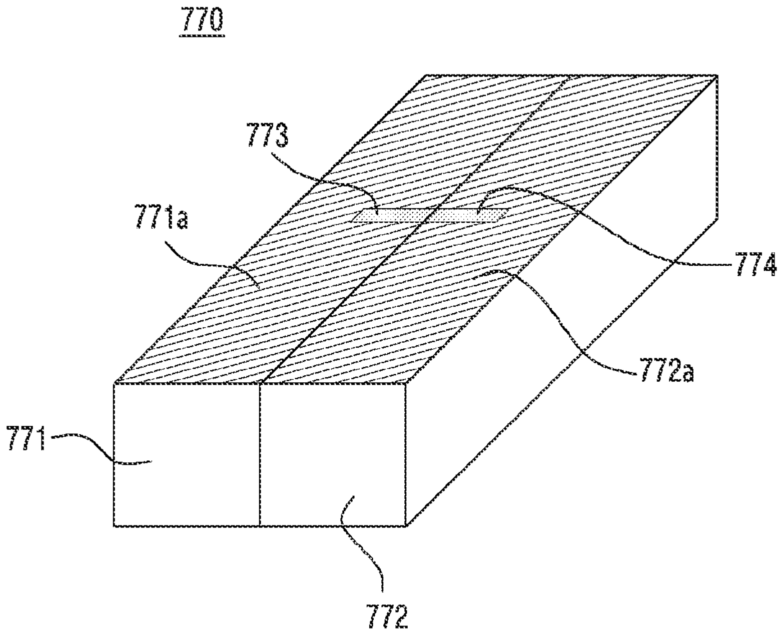
FIG. 7E is a diagram illustrating a rollable electronic device including a twelfth slot structure and a thirteenth slot structure, according to another embodiment.

FIG. 7E is a diagram illustrating a rollable electronic device including a twelfth slot structure and a thirteenth slot structure, according to another embodiment.

Referring to FIG. 7E, the rollable electronic device 770 may include a first housing 771 and a second housing 772.

According to an embodiment, when the rollable electronic device 770 is in the first state, the first housing 771 and the second housing 772 may be disposed to be spaced apart from each other by a predetermined distance or more. According to an embodiment, when the rollable electronic device 770 is in the second state, the first housing 771 and the second housing 772 may be in contact with each other or disposed adjacent to each other within a predetermined distance.

According to an embodiment, A first conductive region 771*a* of the first housing 771 may include a twelfth slot structure 773, and a second conductive region 772*a* of the second housing 772 may include a thirteenth slot structure 774. In an embodiment, in the first state, the wireless communication circuit may transmit and/or receive an RF signal of a predetermined frequency band by feeding power to the twelfth slot structure 773 and/or the thirteenth slot structure 774. In the second state, the twelfth slot structure 773 may be electromagnetically connected to the thirteenth slot structure 774, and the wireless communication circuit may transmit and/or receive an RF signal of the frequency band, substantially the same as that in the first state, based on the twelfth slot structure 773 and the thirteenth slot structure 774.

Figure 7F:
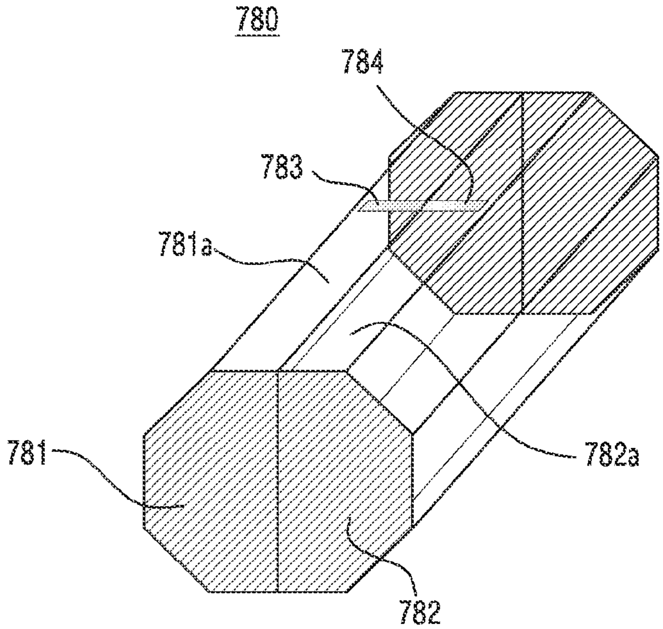
FIG. 7F is a diagram illustrating a rollable electronic device including a fourteenth slot structure and a fifteenth slot structure, according to another embodiment.

FIG. 7F is a diagram illustrating a rollable electronic device including a fourteenth slot structure and a fifteenth slot structure, according to another embodiment.

Referring to FIG. 7F, a rollable electronic device 780 may include a first housing 781 and a second housing 782.

According to an embodiment, when the rollable electronic device 780 is in the first state, the first housing 781 and the second housing 782 may be disposed to be spaced apart from each other by a predetermined distance or more. According to an embodiment, when the rollable electronic device 780 is in the second state, the first housing 781 and the second housing 782 may be in contact with each other or disposed adjacent to each other within a predetermined distance.

According to an embodiment, A first conductive region 781*a* of the first housing 781 may include a fourteenth slot structure 783, and a second conductive region 782*a* of the second housing 782 may include a fifteenth slot structure 784. In an embodiment, in the first state, the wireless communication circuit may transmit and/or receive an RF signal of a predetermined frequency band by feeding power to the fourteenth slot structure 783 and/or the fifteenth slot structure 784. In the second state, the fourteenth slot structure 783 may be electromagnetically connected to the fifteenth slot structure 784, and the wireless communication circuit may transmit and/or receive an RF signal of the frequency band, substantially the same as that in the first state, based on the fourteenth slot structure 783 and the fifteenth slot structure 784.

Figure 8A:
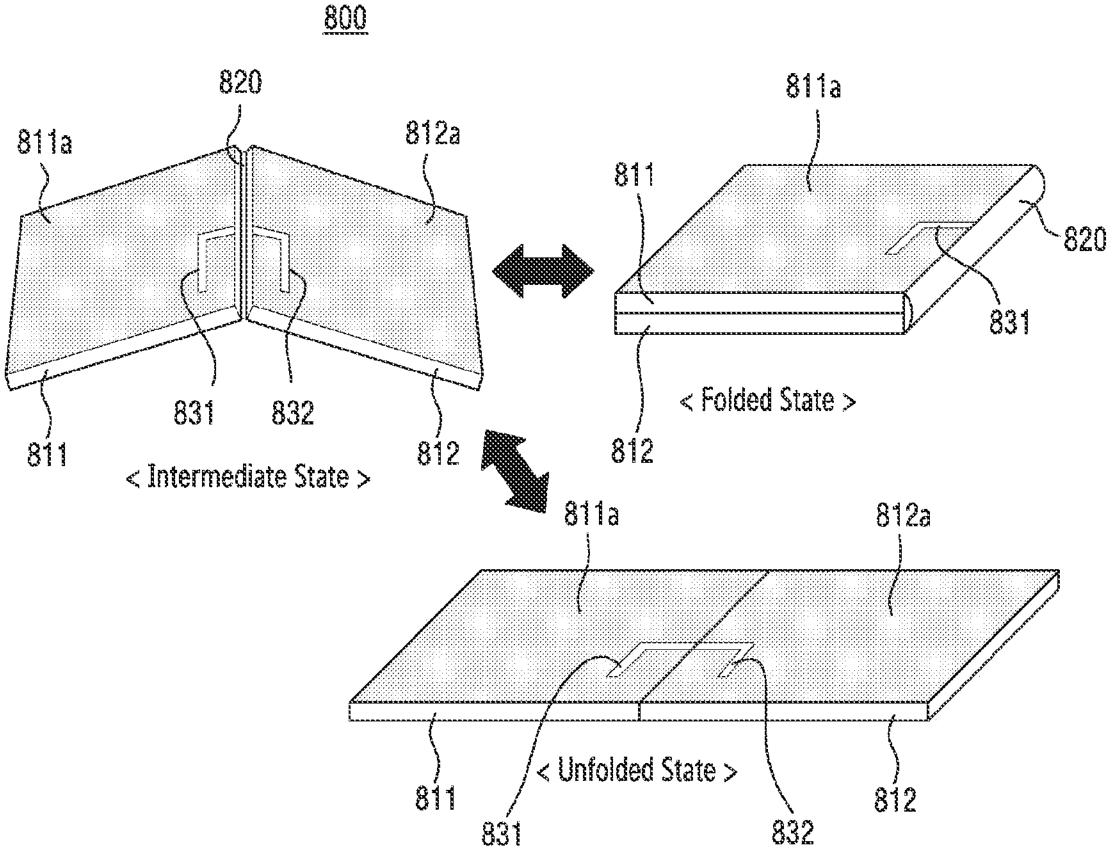
FIG. 8A is a diagram illustrating a foldable electronic device including a slot structure, according to an embodiment.

FIG. 8A is a diagram illustrating a foldable electronic device including a slot structure, according to an embodiment.

Referring to FIG. 8A, a foldable electronic device 800 according to an embodiment may include a first housing 811, a second housing 812, and a connection member 820.

According to an embodiment, The first housing 811 and the second housing 812 may be rotatably connected to each other by the connection member 820. In an embodiment, the connection member 820 may be a hinge structure including a hinge driving unit. In an embodiment, the connection member 820 may be folded about a rotation axis.

According to an embodiment, the foldable electronic device 800 is illustrated as including a structure in which the first housing 811 and the second housing 812 are foldable with reference to the rotation axis (or a horizontal folding structure), but is not limited thereto. Alternatively, the first housing 811 and the second housing 812 may include a vertical folding structure.

According to an embodiment, the foldable electronic device 800 may have a folded state, an intermediate state, and/or an unfolded state.

According to an embodiment, a first conductive region 811*a* of the first housing 811 may include a first slot structure 831, and a second conductive region 812*a* of the second housing 812 may include a second slot structure 832.

According to an embodiment, the first slot structure 831 and the second slot structure 832 may have substantially the same physical length.

In an embodiment, the first slot structure 831 and the second slot structure 832 may have different physical lengths. In an embodiment, even if the physical lengths of the first slot structure 831 and the second slot structure 832 are different from each other, it is possible to make the first slot structure 831 and the second slot structure 832 have substantially the same electrical length in terms of RF by electrically connecting a lumped element or an impedance matching circuit to the second slot structure 832.

According to an embodiment, when the foldable electronic device 800 is in the folded state, the wireless communication circuit may transmit or receive an RF signal of a sixth frequency band by feeding power to a point of the first slot structure 831.

According to an embodiment, when the foldable electronic device 800 is in the unfolded state, the wireless communication circuit may transmit or receive an RF signal of the sixth frequency band as in the folded state based on an electrical path including the first slot structure 831 and the second slot structure 832. For example, when the foldable electronic device 800 is in the unfolded state, in the wireless communication circuit, the first slot structure 831 and the second slot structure 832 may be electromagnetically connected to each other to operate as a single slot structure.

Figure 8B:
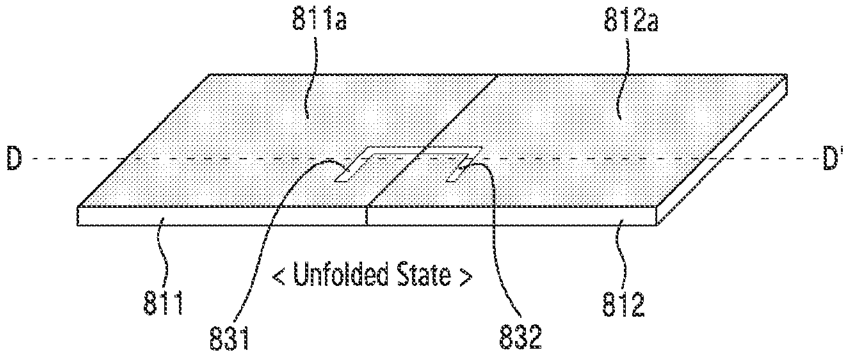
FIG. 8B is a diagram illustrating a cross-sectional view of the foldable electronic device taken along line D-D', according to an embodiment.
Figure 8B:
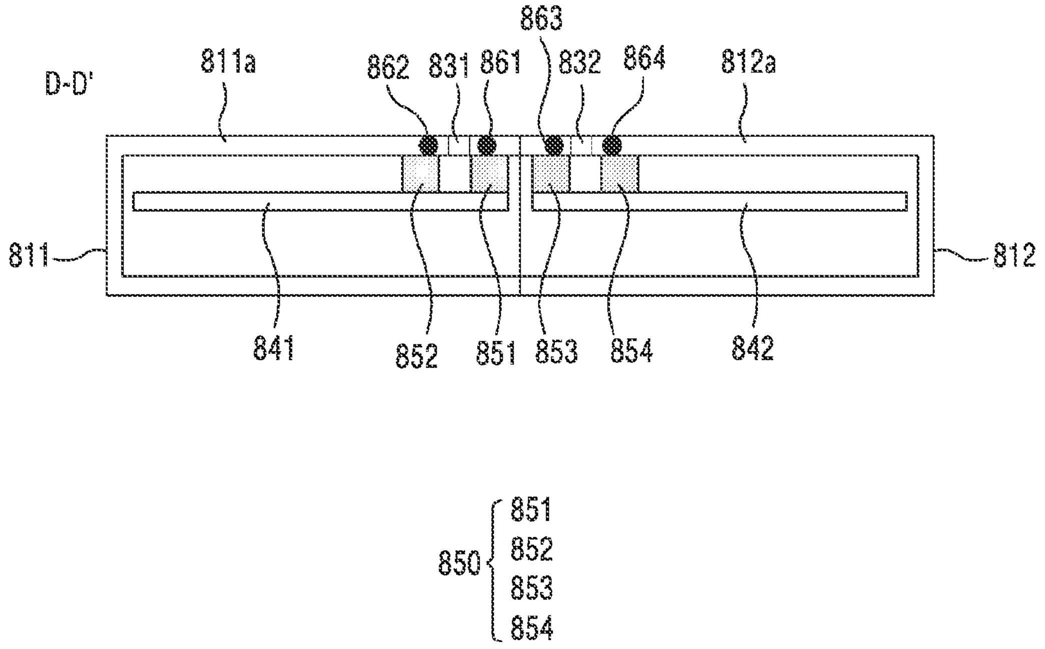

FIG. 8B is a diagram illustrating a cross-sectional view of the foldable electronic device taken along line D-D', according to an embodiment.

Referring to FIG. 8B, the foldable electronic device 800 may include conductive connection members 850, a first PCB 841, and a second PCB 842. In an embodiment, among the conductive connection members 850, a first conductive connection member 851 and a second conductive connection member 852 may be disposed between the first PCB 841 and the first conductive region 811*a*. In an embodiment, among the conductive connection members 850, a third conductive connection member 853 and a fourth conductive connection member 854 may be disposed between the second PCB 842 and the second conductive region 812*a*.

According to an embodiment, a plurality of electronic components (e.g., a first wireless communication circuit) may be disposed on the first PCB 841, and a plurality of electronic components (e.g., a second wireless communication circuit) may be disposed on the second PCB 842. In an embodiment, the first wireless communication circuit on the first PCB 841 may feed power to a first point 861 of the first slot structure 831 via the first conductive connection member 851. According to an embodiment, the first PCB 841 may include a plurality of conductive layers, and at least some of the plurality of conductive layers may include a ground. The ground of the first PCB 841 may be electrically connected to a second point 862 of the first slot structure 831 via the second conductive connection member 852.

In an embodiment, the second wireless communication circuit on the second PCB 842 may feed power to a third point 863 of the second slot structure 832 via the third conductive connection member 853. According to an embodiment, the second PCB 842 may include a plurality of conductive layers, and at least some of the plurality of conductive layers may include a ground. The ground of the second PCB 842 may be electrically connected to a fourth point 864 of the second slot structure 832 via the fourth conductive connection member 854.

Figure 9:
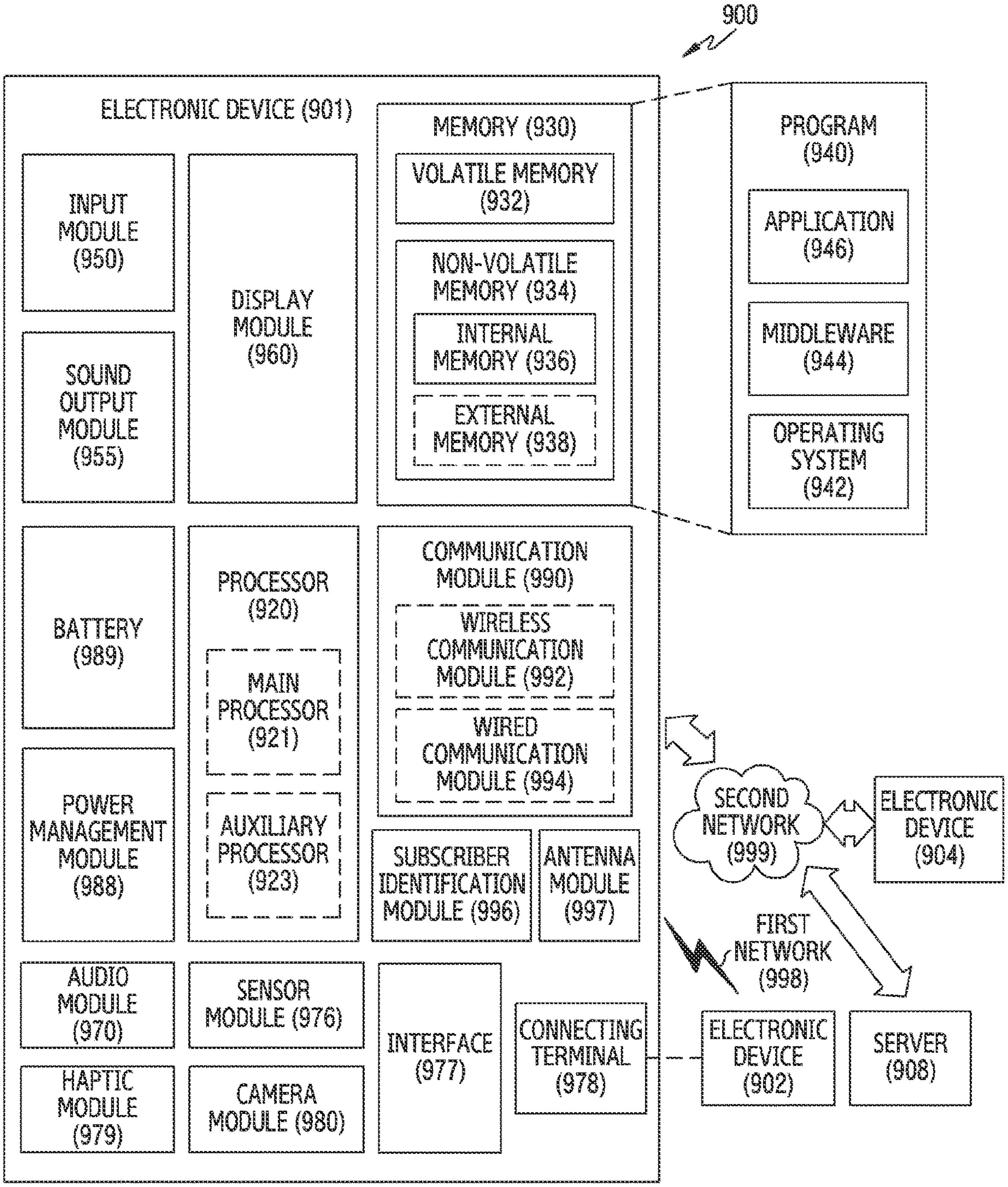
FIG. 9 is a block diagram of an electronic device in a network environment, according to an embodiment.

FIG. 9 is a block diagram illustrating an electronic device in a network environment, according to an embodiment.

Referring to FIG. 9, an electronic device 901 in a network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a PCB). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

According to an embodiment, an electronic device includes a first housing including a first conductive region. The first conductive region includes a first slot structure that extends to a first edge of the first housing. The electronic device also includes a second housing configured to be movable with respect to the first housing and including a second conductive region. The second conductive region includes a second slot structure that extends to a second edge of the second housing. The electronic device also includes a wireless communication circuit configured to feed power to a first point on the first slot structure. The wireless communication circuit is configured to receive a first signal of a first frequency band based on a first electrical path that includes the first slot structure while the electronic device is in a first state in which the first edge of the first housing and the second edge of the second housing are spaced apart from each other, and to receive a second signal of the first frequency band based on a second electrical path that includes the first slot structure and the second slot structure while the electronic device is in a second state in which the first edge of the first housing is in contact with the second edge of the second housing.

According to an embodiment, in the first state, the wireless communication circuit may receive the first signal of the first frequency band by feeding power to a second point on the second slot structure.

According to an embodiment, the first frequency band may correspond to 2.2 to 2.5 GHz.

According to an embodiment, the first slot structure may have an L shape, and the second slot structure may have an inverted-L shape.

According to an embodiment, A first end of the first slot structure and a second end of the second slot structure may be in contact with each other or may be adjacent to each other within a predetermined distance.

According to an embodiment, in the second state, the first end of the first slot structure may be in direct contact with the second end of the second slot structure.

According to an embodiment, in the second state, the first end of the first slot structure may be in electrical contact with the second end of the second slot structure via a contact structure.

According to an embodiment, the one end of the first slot structure and the second end of the second slot structure may be electrically connected to each other via a coupling in the second state in which the first end of the first slot structure and the second end of the second slot structure are adjacent to each other within the predetermined distance.

According to an embodiment, the second slot structure may have an electrical length equal to the electrical length of the first slot structure.

According to an embodiment, the electronic device may further include a lumped element, wherein the lumped element may be electrically connected to the second slot structure in the first state to extend or reduce the electrical length of the second slot structure, and the wireless communication circuit may be configured to receive a third signal of a second frequency band based on a third electrical path including the second slot structure and the lumped element.

According to an embodiment, the electronic device may further include a switch circuit disposed in the second housing. The switch circuit may be configured to control the lumped element and the second slot structure to be electrically connected with each other in the first state, and to control the lumped element and the second slot structure to be electrically disconnected from each other in the second state.

According to an embodiment, the electronic device may further include a third slot structure extending from a third point on the second slot structure and having a predetermined electrical length, wherein the wireless communication circuit may be configured to receive a third signal of a second frequency band by feeding power to a point of the third slot structure.

According to an embodiment, the electronic device may further include a third slot structure that extends along the first edge of the first housing and may further include a fourth slot structure that extends along with the second edge of the second housing. The third slot structure and the fourth slot structure may be in contact with each other in the second state. The wireless communication circuit may be configured to receive a third signal of a second frequency band based on a third electrical path including the third slot structure in the first state, and to receive a fourth signal of the second frequency band based on a fourth electrical path including the third slot structure and the fourth slot structure in the second state.

According to an embodiment, the first slot structure may be disposed on a rear surface of the first housing, and the second slot structure may be disposed on a rear surface of the second housing.

According to an embodiment, the electronic device may further include a flexible display. In the second state, the flexible display may be inserted into the first housing, and during the switching from the second state to the first state, the flexible display may be pulled out from the first housing.

According to an embodiment, an electronic device includes a first housing including a first conductive region. The first conductive region includes a first slot structure that extends to a first edge of the first housing. The electronic device also includes a second housing that is movable with respect to the first housing and includes a second conductive region. The second conductive region includes a second slot structure that extends to a second edge of the second housing. The electronic device also includes a wireless communication circuit configured to feed power to a first point on the first slot structure. The wireless communication circuit is configured to receive a first signal of a first frequency band based on a first electrical path that includes the first slot structure while the electronic device is in a first state in which the first edge of the first housing and the second edge of the second housing are spaced apart from each other, and to receive a second signal of the first frequency band based on a second electrical path that includes the first slot structure and the second slot structure while the electronic device is in a second state in which the first edge of the first housing and the second edge of the second housing are in contact with each other. In the second state, a first end of the first slot structure and a second end of the second slot structure are in contact with each other or are adjacent to each other within a predetermined distance According to an embodiment, in the second state, the first slot structure and the second slot structure may be electrically connected to each other via a contact structure.

According to an embodiment, the second slot structure may have an electrical length equal to the electrical length of the first slot structure.

According to an embodiment, the electronic device may further include a lumped element. The lumped element may be electrically connected to the second slot structure in the first state to extend or reduce the electrical length of the second slot structure, and the wireless communication circuit may be configured to receive a third signal of a second frequency band based on a third electrical path including the second slot structure and the lumped element.

According to an embodiment, the electronic device may further include a third slot structure that extends along the first edge of the first housing and a fourth slot structure that extends along the second edge of the second housing. The third slot structure and the fourth slot structure may be in contact with each other in the second state. The wireless communication circuit may be configured to receive a third signal of a second frequency band based on a third electrical path including the third slot structure in the first state, and to receive a fourth signal of the second frequency band based on a fourth electrical path including the third slot structure and the fourth slot structure in the second state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:

a first housing including a first conductive region, wherein the first conductive region includes a first slot structure that extends to a first edge of the first housing;

a second housing configured to be slidable to move with respect to the first housing and including a second conductive region, wherein the second conductive region includes a second slot structure that extends to a second edge of the second housing; and a wireless communication circuit configured to feed power to a first point of the first conductive region. wherein the first point is adjacent to the first slot structure, and wherein the wireless communication circuit is configured to:

receive a first signal of a first frequency band based on a first electrical path formed in the first conductive region along an edge of the first slot structure while the electronic device is in a first state in which the first edge of the first housing and the second edge of the second housing are spaced apart from each other by sliding of the second housing, and receive a second signal of the first frequency band based on a second electrical path formed in the first conductive region and the second conductive region along the edge of the first slot structure and an edge of the second slot structure while the electronic device is in a second state in which the first edge of the first housing is in contact with the second edge of the second housing by sliding of the second housing.

2. The electronic device of claim 1, wherein, in the first state, the wireless communication circuit is configured to receive the first signal of the first frequency band based on an electrical path formed by feeding power to a second point of the second conductive region, and wherein the second point is adjacent to the second slot structure.

3. The electronic device of claim 1, wherein the first frequency band corresponds to 2.2 GHz to 2.5 GHz.

4. The electronic device of claim 1, wherein the first slot structure has an L shape, and wherein the second slot structure has an inverted-L shape.

5. The electronic device of claim 1, wherein, in the second state, a first end of the first slot structure and a second end of the second slot structure are in contact with each other or are adjacent to each other within a predetermined distance.

6. The electronic device of claim 5, wherein, in the second state, the first end of the first slot structure is in direct contact with the second end of the second slot structure.

7. The electronic device of claim 5, wherein, in the second state, the first end of the first slot structure is in electrical contact with the second end of the second slot structure via a contact structure.

8. The electronic device of claim 5, wherein the first end of the first slot structure and the second end of the second slot structure are electrically connected to each other via a coupling in the second state in which the first end of the first slot structure and the second end of the second slot structure are adjacent to each other within the predetermined distance.

9. The electronic device of claim 1, wherein the second slot structure corresponds to an electrical length equal to an electrical length corresponding to the first slot structure.

10. The electronic device of claim 1, further comprising:
a lumped element,
wherein, in the first state, the lumped element is electrically connected to the second conductive region including the second slot structure to extend or reduce an electrical length of a third electrical path formed in the second conductive region along the edge of the second slot structure, and
wherein the wireless communication circuit is configured to receive a third signal of a second frequency band based on the third electrical path.

11. The electronic device of claim 10, further comprising:
a switch circuit disposed in the first housing or the second housing,
wherein the switch circuit is configured to:
control the lumped element to be electrically connected with the second conductive region including the second slot structure in the first state, and
control the lumped element to be electrically disconnected with the second conductive region including the second slot structure in the second state.

12. The electronic device of claim 1, further comprising:
a third slot structure extending from a third point on the second slot structure and corresponding to a predetermined electrical length,
wherein the wireless communication circuit is configured to receive a third signal of a second frequency band based on an electrical path formed by feeding power to a point of the second conductive region, and
wherein the point is adjacent to the third slot structure.

13. The electronic device of claim 1,
wherein the first conductive region includes a third slot structure that extends along the first edge of the first housing; and
wherein the second conductive region includes a fourth slot structure that extends along the second edge of the second housing,
wherein, in the second state, the third slot structure and the fourth slot structure are in contact with each other, and
wherein the wireless communication circuit is configured to:
receive a third signal of a second frequency band based on a third electrical path formed in the first conductive region along an edge of the third slot structure in the first state, and
receive a fourth signal of the second frequency band based on a fourth electrical path formed in the first conductive region and the second conductive region along the third slot structure and the fourth slot structure in the second state.

14. The electronic device of claim 1, wherein the first slot structure is disposed on a rear face of the first housing, and the second slot structure is disposed on a rear face of the second housing.

15. The electronic device of claim 14, further comprising:
a flexible display,
wherein, in the second state, the flexible display is inserted into the first housing, and during switching from the second state to the first state, the flexible display is pulled out from the first housing.

16. An electronic device comprising:
a first housing including a first conductive region, wherein the first conductive region includes a first slot structure that extends to a first edge of the first housing;
a second housing configured to be slidable to move with respect to the first housing and including a second conductive region, wherein the second conductive region includes a second slot structure that extends to a second edge of the second housing; and
a wireless communication circuit configured to feed power to a first point of the first conductive region. wherein the first point is adjacent to the first slot structure,
wherein the wireless communication circuit is configured to:
receive a first signal of a first frequency band based on a first electrical path formed in the first conductive region along an edge of the first slot structure while the electronic device is in a first state in which the first edge of the first housing and the second edge of the second housing are spaced apart from each other by sliding of the second housing, and
receive a second signal of the first frequency band based on a second electrical path formed in the first conductive region and the second conductive region along the edge of the first slot structure and an edge of the second slot structure while the electronic device is in a second state in which the first edge of the first housing and the second edge of the second housing are in contact with each other by sliding of the second housing, and
wherein, in the second state, a first end of the first slot structure and a second end of the second slot structure are in contact with each other.

17. The electronic device of claim 16, wherein, in the second state, the first slot structure and the second slot structure are electrically connected to each other via a contact structure.

18. The electronic device of claim 16, wherein the second slot structure corresponds to an electrical length equal to an electrical length corresponding to the first slot structure.

19. The electronic device of claim 16, further comprising:
a lumped element,
wherein, in the first state, the lumped element is electrically connected to the second conductive region including the second slot structure to extend or reduce an electrical length of a third electrical path formed in the second conductive region along the edge of the second slot structure, and
wherein the wireless communication circuit is configured to receive a third signal of a second frequency band based on the third electrical path.

20. The electronic device of claim 16,
wherein the first conductive region includes a third slot structure that extends along the first edge of the first housing structure; and wherein the second conductive region includes a fourth slot structure that extends along the second edge of the second housing, wherein, in the second state, the third slot structure and the fourth slot structure are in contact with each other, and wherein the wireless communication circuit is configured to:

receive a third signal of a second frequency band based on a third electrical path formed in the first conductive region along an edge of the third slot structure in the first state, and receive a fourth signal of the second frequency band based on a fourth electrical path formed in the first conductive region and the second conductive region along the third slot structure and the fourth slot structure in the second state.

* * * * *